United States Patent
Matsumura et al.

(10) Patent No.: US 10,212,575 B2
(45) Date of Patent: Feb. 19, 2019

(54) TERMINAL DEVICE, DATA TRANSMISSION METHOD, AND DATA TRANSFER METHOD

(71) Applicant: SONY CORPORATION, Tokyo (JP)

(72) Inventors: Tomoaki Matsumura, Tokyo (JP); Takeshi Itagaki, Saitama (JP); Tadashi Ehara, Kanagawa (JP); Yoshihiko Ikenaga, Tokyo (JP); Shinji Takae, Tokyo (JP)

(73) Assignee: SONY CORPORATION, Tokyo (JP)

( * ) Notice: Subject to any disclaimer, the term of this patent is extended or adjusted under 35 U.S.C. 154(b) by 122 days.

(21) Appl. No.: 15/104,648

(22) PCT Filed: Dec. 17, 2014

(86) PCT No.: PCT/JP2014/083483
§ 371 (c)(1),
(2) Date: Jun. 15, 2016

(87) PCT Pub. No.: WO2015/098666
PCT Pub. Date: Jul. 2, 2015

(65) Prior Publication Data
US 2016/0316354 A1    Oct. 27, 2016

(30) Foreign Application Priority Data

Dec. 27, 2013 (JP) ................................. 2013-271887

(51) Int. Cl.
*H04W 8/00* (2009.01)
*H04W 40/22* (2009.01)
*H04W 76/10* (2018.01)
*H04W 88/04* (2009.01)

(52) U.S. Cl.
CPC ........... *H04W 8/005* (2013.01); *H04W 40/22* (2013.01); *H04W 76/10* (2018.02); *H04W 88/04* (2013.01)

(58) Field of Classification Search
CPC ..... H04W 8/005; H04W 88/04; H04W 40/22; H04W 76/02
See application file for complete search history.

(56) References Cited

U.S. PATENT DOCUMENTS

2011/0158212 A1* 6/2011 Sakai .................... H04W 8/005
370/338
2012/0122431 A1* 5/2012 Moon ................. H04M 1/7253
455/414.1

FOREIGN PATENT DOCUMENTS

| JP | 2003-229954 A | 8/2003 |
|---|---|---|
| JP | 2005-123781 A | 5/2005 |
| JP | 2005-203949 A | 7/2005 |

(Continued)

*Primary Examiner* — Paul H Masur
(74) *Attorney, Agent, or Firm* — Xsensus LLP

(57) ABSTRACT

Efficient data transfer over a public network is achieved. A terminal searching unit searches for a neighboring terminal device. A display unit displays a list of terminal devices discovered by the terminal searching unit. A terminal selecting unit selects a predetermined terminal device included in the list based on the list displayed on the display unit. A data transmission unit transmits data using the predetermined terminal device selected by the terminal selecting unit as a relay. The list of neighboring terminal devices discovered by the search is displayed and a predetermined terminal device is selected using the list and is used for relay transfer, which allows the user to easily select a predetermined terminal device to be used for the relay transfer.

9 Claims, 36 Drawing Sheets

(56) References Cited

FOREIGN PATENT DOCUMENTS

| JP | 2007-096917 A | 4/2007 |
|----|---------------|--------|
| JP | 2009-246419 A | 10/2009 |
| JP | 4856084 B | 1/2012 |
| JP | 2012-023506 A | 2/2012 |
| JP | 2012-023601 A | 2/2012 |

* cited by examiner

FIG.9

| TERMINAL INFORMATION | | PUBLIC NETWORK WIRELESS CONNECTION INFORMATION | | | | SHORT-RANGE WIRELESS CONNECTION INFORMATION | | | |
|---|---|---|---|---|---|---|---|---|---|
| ID | REMAINING BATTERY LEVEL | REMAINING AVAILABLE COMMUNICATION AMOUNT | CARRIER | COMMUNICATION PROTOCOL | CELL ID | ESTIMATED MAXIMUM THROUGHPUT | SUPPORTED FREQUENCY BAND | STATE | PARTICIPATION CONDITION |
| A | 90% | 5.0GB | CARRIER A | LTE | 0x12345678 | 30Mbps | 2.4GHz | PARTICIPATING IN RELAY | UNTIL 15:00 UP TO 40% BATTERY |
| B | 60% | 4.0GB | CARRIER B | LTE | 0x87654321 | 62Mbps | 2.4GHz/5GHz | PARTICIPATING IN RELAY | NONE |
| C | 70% | 6.5GB | CARRIER A | W-CDMA | 0x9abcdef0 | 50Mbps | 2.4GHz | NONPARTICIPATION | NONE |

TERMINAL DEVICE, DATA TRANSMISSION METHOD, AND DATA TRANSFER METHOD

CROSS REFERENCE TO RELATED APPLICATIONS

This application is a U.S. National Phase of International Patent Application No. PCT/JP2014/083483 filed on Dec. 17, 2014, which claims priority benefit of Japanese Patent Application No. 2013-271887 filed in the Japan Patent Office on Dec. 27, 2013. Each of the above-referenced applications is hereby incorporated herein by reference in its entirety.

TECHNICAL FIELD

The present technology relates to a terminal device, a data transmission method, and a data transfer method, and more particularly, to a terminal device that constitutes a communication system used to perform the relay transfer of data.

BACKGROUND ART

Mobile communications using a public network become widespread for its convenience. In the public network, a terminal is connected to a base station over a wireless link, and it is possible to use a number of network services including the Internet over a network of the carrier. It is also known that a terminal is connected to a network through another terminal (e.g., Patent Literature 1).

CITATION LIST

Patent Literature

Patent Literature 1: JP 4856084B

SUMMARY OF INVENTION

Technical Problem

Communication speed of the public network has been faster with the evolution of communication protocols, while there is a tendency that the size of data being handled by a network service increases every year. For example, when a high-quality, long-time recorded moving image and other data is to be uploaded, the size of the data is very large, and thus the use of only one line connection takes a long time to complete its uploading.

By taking the approach of using a plurality of lines simultaneously, this problem can be solved. However, if the cost occurs to maintain the line, the cost will continue to occur regardless of whether to upload. If a mechanism to dynamically add or delete the line of the contract in another application can be provided even without a fixed dedicated line contract, the flexibility can be given to the transfer system. In addition, when a plurality of lines are managed by manual, participation or withdrawal of the user's terminal is necessary to be determined by taking into account various information such as the congestion degree and the communication cost of the network.

It is desirable for the present technology to be capable of performing appropriately data transfer over a public network.

Solution to Problem

A concept of the present technology resides in a terminal device including: a terminal searching unit configured to search for a neighboring terminal device; a display unit configured to display a list of terminal devices discovered by the terminal searching unit; a terminal selecting unit configured to select a predetermined terminal device included in the list based on the list displayed on the display unit; and a data transmission unit configured to transmit data using the predetermined terminal device selected by the terminal selecting unit as a relay.

In the present technology, the terminal searching unit allows a neighboring terminal device to be searched for. The display unit allows a list of the terminal devices discovered by the terminal searching unit to be displayed. The terminal selecting unit allows a predetermined terminal device included in the list to be selected based on the list displayed on the display unit. The data transmission unit allows the predetermined terminal device selected by the terminal selecting unit to be used as a relay to transmit data.

For example, the display unit may further display a predicted transfer rate in association with each of the terminal devices being listed. For example, the display unit may display any one or more of the terminal devices being listed in a display form indicating that selection is recommended. For example, the display unit may further display user information in association with each of the terminal devices being listed.

In the present technology as described above, the list of neighboring terminal devices discovered by the search is displayed, and a predetermined terminal device is selected using the list and is used for relay transfer. This allows the user to easily select a predetermined terminal device to be used for the relay transfer. In this case, by displaying a predicted transfer rate, information indicating whether there is recommendation, user information, or the like in association with each of the terminal devices being listed, the user can select a predetermined terminal device to be used for the relay transfer more appropriately.

According to the present technology, for example, the terminal device may further include: a connection request transmission unit configured to transmit a connection request to the predetermined terminal device selected by the terminal selecting unit; and a reply reception unit configured to receive a reply to the connection request from the predetermined terminal device in response to the connection request. The data transmission unit may transmit data using the predetermined terminal device selected by the terminal selecting unit as a relay when the reply received by the reply reception unit indicates connection permission. Accordingly, the predetermined terminal device can be used for the relay transfer with the permission of the user of the predetermined terminal device.

For example, the connection request transmitted from the connection request transmission unit to the predetermined terminal device may additionally include information indicating a connection condition. For example, the connection request transmitted from the connection request transmission unit to the predetermined terminal device may additionally include predicted transfer rate information. In this case, the user of the predetermined terminal can determine whether to participate in the relay transfer in consideration of a connection condition, predicted transfer rate, or the like.

For example, the data transmitted from the data transmission unit to the predetermined terminal device may additionally include transfer rate information of the predetermined terminal device.

Another concept of the present technology resides in a terminal device including: a terminal searching unit configured to search for a neighboring terminal device; a display unit configured to display a list of terminal devices discovered by the terminal searching unit; a terminal selecting unit configured to select a predetermined terminal device included in the list based on the list displayed on the display unit; and a data transfer unit configured to relay data sent from the predetermined terminal device selected by the terminal selecting unit.

In the present technology, the terminal searching unit allows a neighboring terminal device to be searched for. The display unit allows a list of the terminal devices discovered by the terminal searching unit to be displayed. The terminal selecting unit allows a predetermined terminal device included in the list to be selected based on the list displayed on the display unit. The data transmission unit allows data sent from the predetermined terminal device selected by the terminal selecting unit to be relayed.

For example, the display unit, when a participation condition is set, may display the participation condition being set in association with each of the terminal devices being listed. For example, the display unit, when reward is set, may display the reward being set in association with each of the terminal devices being listed. For example, the display unit may further display user information in association with each of the terminal devices being listed.

In this way, in the present technology, the list of neighboring terminal devices discovered by the search is displayed, a predetermined terminal device is selected using the list, and the relay of data transfer from the predetermined terminal is performed. Thus, the user can easily select a predetermined terminal device in which its own terminal is to be used for the relay transfer. In this case, by displaying a participation condition, rewards, user information, or the like in association with each of the terminal devices being listed, the user can select a predetermined terminal device in which its own terminal is to be used for the relay transfer more appropriately.

According to the present disclosure, for example, the display unit, when the data transferred from the data transfer unit is content data and the reward is for delivered content viewing, may display a playback screen of the content data.

Advantageous Effects of Invention

According to the present technology, it is possible to appropriately perform data transfer over a public network. Note that the advantageous effects described herein are illustrative rather than restrictive and any other effects may be achieved.

BRIEF DESCRIPTION OF DRAWINGS

FIG. 9 is a diagram illustrating an example of contents of a table (terminal management table).

DESCRIPTION OF EMBODIMENTS

Hereinafter, modes for carrying out the invention (hereinafter, referred to as "embodiment") will be described. Note that the description will be given in the following order.

1. Embodiments
2. Modifications

<1. Embodiments>

[Exemplary Configuration of Communication System]

Figure 1:
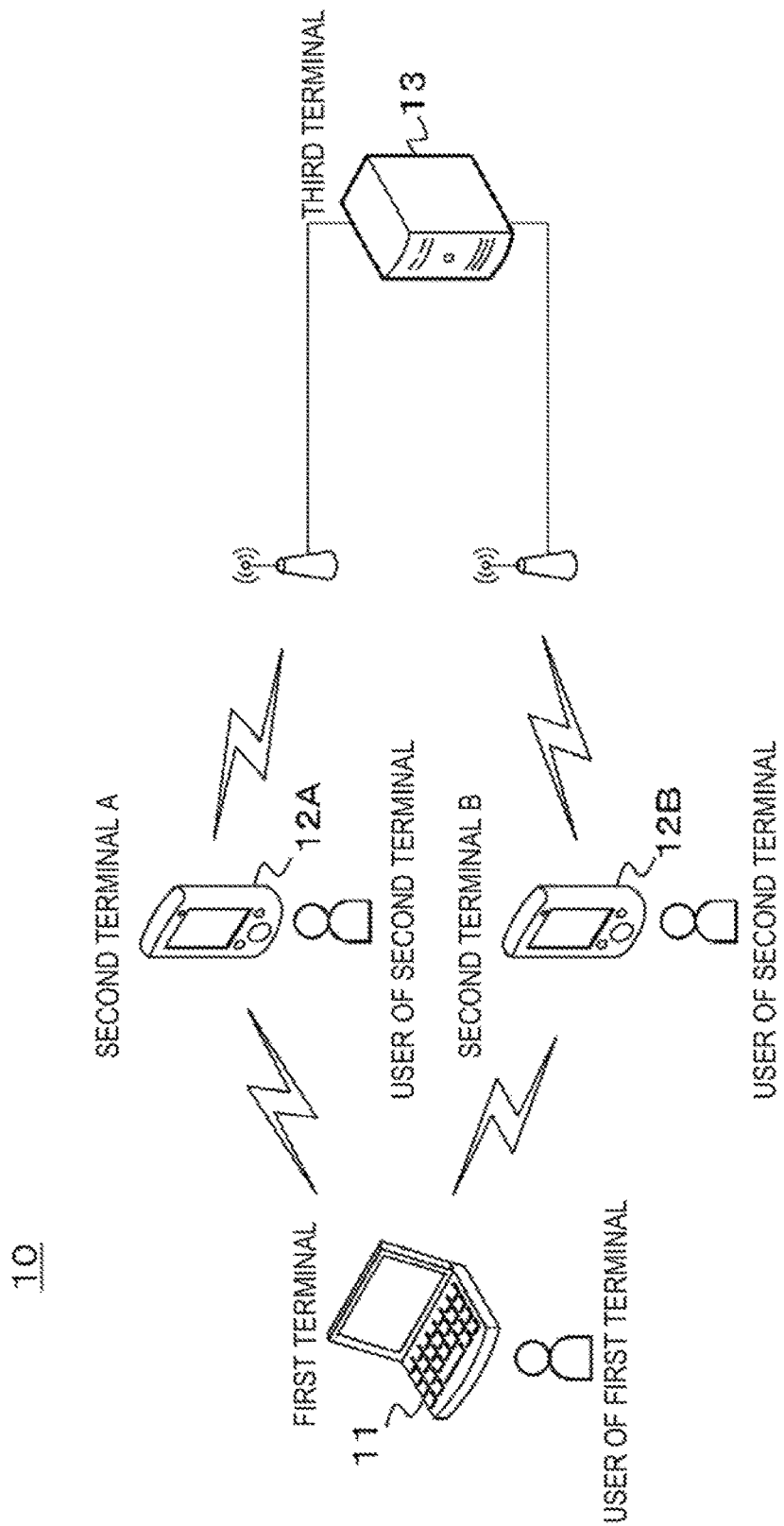
FIG. 1 is a block diagram illustrating an exemplary configuration of a communication system as an embodiment.

FIG. 1 illustrates an exemplary configuration of a communication system 10 as an embodiment. The communication system 10 is configured to include a first terminal 11 serving as a transmission and reception entity, a third terminal serving as a transmission and reception opposite party, and one or more second terminals 12, in this example, two second terminals 12A and 12B serving as a role of relay of transmission and reception. The second terminal 12 can dynamically participate in or withdraw from the communication system 10. The user (photographer) of the first terminal operates the first terminal 11. The users (cooperators) of the second terminals operate the second terminals (12A and 12B).

Figure 2:
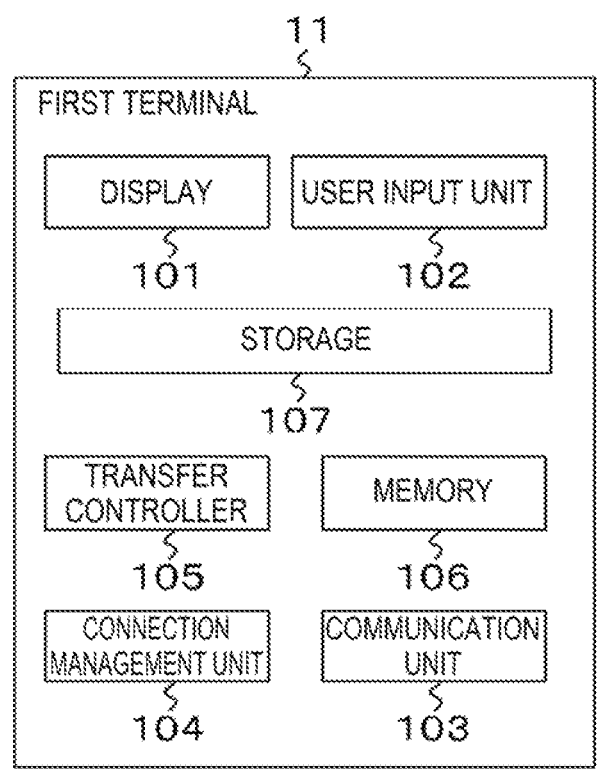
FIG. 2 is a block diagram illustrating an exemplary configuration of a first terminal of the communication system.

FIG. 2 illustrates an exemplary configuration of the first terminal 11. The first terminal 11 is configured to include a display 101, a user input unit 102, a communication unit 103, a connection management unit 104, a transfer controller 105, a memory 106, and a storage 107. The display 101 and the user input unit 102 constitute an interface (user interface) with the user of the first terminal 11. The communication unit 103 performs addition of a header or error detection code, a modulation process, or the like during transmission, and performs a demodulation process, analysis of header information, a reordering process, or the like during reception. In this embodiment, the communication unit 103 has a communication protocol that allows communication with the second terminal 12.

The transfer controller 105 controls data in the storage 107 to be distributed to each of the second terminals 12 when the data is to be transferred to the third terminal 13. On the other hand, when data is received from the third terminal 13, a process for restoring the data relayed by each of the second terminals 12 to its original state in the third terminal 13 is performed. Then, in some cases, the data restored to its original state is saved in the storage 107. The connection management unit 104 manages the connection condition between it and the one or more second terminals 12 that are detected within a communication range. Specifically, the determination whether to cause the second terminal 12 to participate in the transfer to the third terminal is performed.

Figure 3:
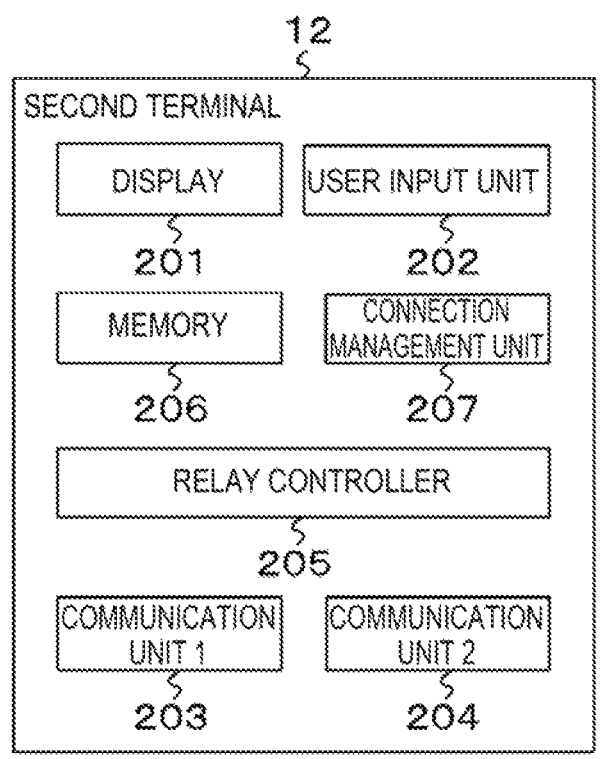
FIG. 3 is a block diagram illustrating an exemplary configuration of a second terminal of the communication system.

FIG. 3 illustrates an exemplary configuration of the second terminal 12 (12A and 12B). The second terminal 12 is configured to include a display 201, a user input unit 202, a plurality of, in the illustrated example two, communication units 203 and 204, a relay controller 205, a memory 206, and a connection management unit 207. The display 201 and the user input unit 202 constitute an interface (user interface) with the user of the second terminal 12. The communication units 203 and 204 have a similar role to that of the first terminal 11. In the following implementation examples, each of the second terminals 12 has two communication units 203 and 204, is connected to the first terminal 11 through the communication unit 203, and is connected to the third terminal 13 via the communication unit 204.

The connection management unit 207 manages the connection condition of each of the communication units 203 and 204. Specifically, a process for searching for the first terminal 11 and connecting to it is performed, or a process for determining whether to participate in the relay of data depending on the situation when a request for relay is made from the first terminal 11 is performed. The relay controller 205 performs a process for relaying the data received from the first terminal 11 through the communication unit 203 to the third terminal 13 through the communication unit 204, or performs a process for relaying the data received from the third terminal 13 to the first terminal 11. A process for converting the protocol is also performed if necessary.

Figure 4:
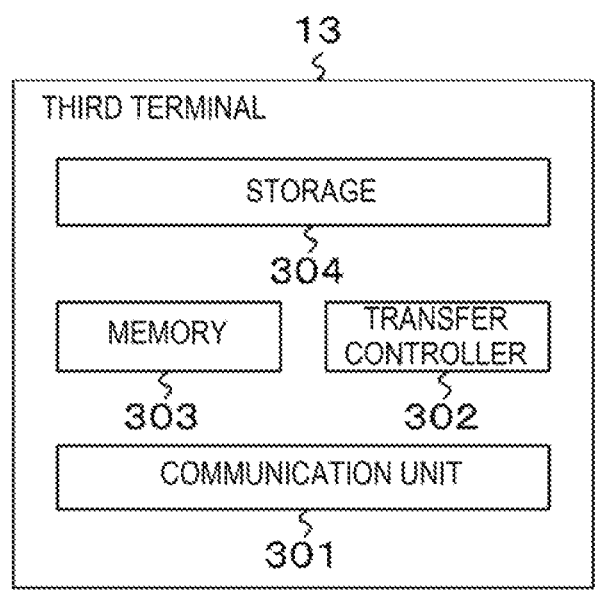
FIG. 4 is a block diagram illustrating an exemplary configuration of a third terminal of the communication system.

FIG. 4 illustrates an exemplary configuration of the third terminal 13. The third terminal 13 is configured to include a communication unit 301, a transfer controller 302, a memory 303, and a storage 304. The communication 301 has a similar role to that of the communication 103 of the first terminal 11. The transfer controller 302, when receiving data from the first terminal 11, performs a process for restoring the data relayed by each of the second terminals 12 to its original state in the first terminal 11. Then, in some cases, it is saved in the storage 304. In contrast, when the data in the storage 304 is to be transferred to the first terminal 11, a process for distributing the data to each of the second terminals 12 is performed.

[Detailed Implementation Example]

In the following, a method of presenting information used to assist the user in the determination when the first terminal 11 is connected to the second terminal 12 and data is transmitted (data transfer) to the third terminal 13 will be described by using four implementation examples. The respective implementation examples are classified based on whether the application is for professional or consumer use or whether the second terminal's user is a specified user or unspecified users.

For example, it is assumed that the first terminal 11 is a personal computer (PC), the second terminal 12 is a mobile terminal such as smartphones, and the third terminal 13 is a cloud server. The present technology is not limited thereto. In addition, the first terminal 11 and the second terminal 12 communicate with each other using a shot-range wireless communication (e.g., Wi-Fi), and the second terminal 12 communicates with the third terminal 13 over a public wireless network (e.g., 3G or LTE).

Figure 5:
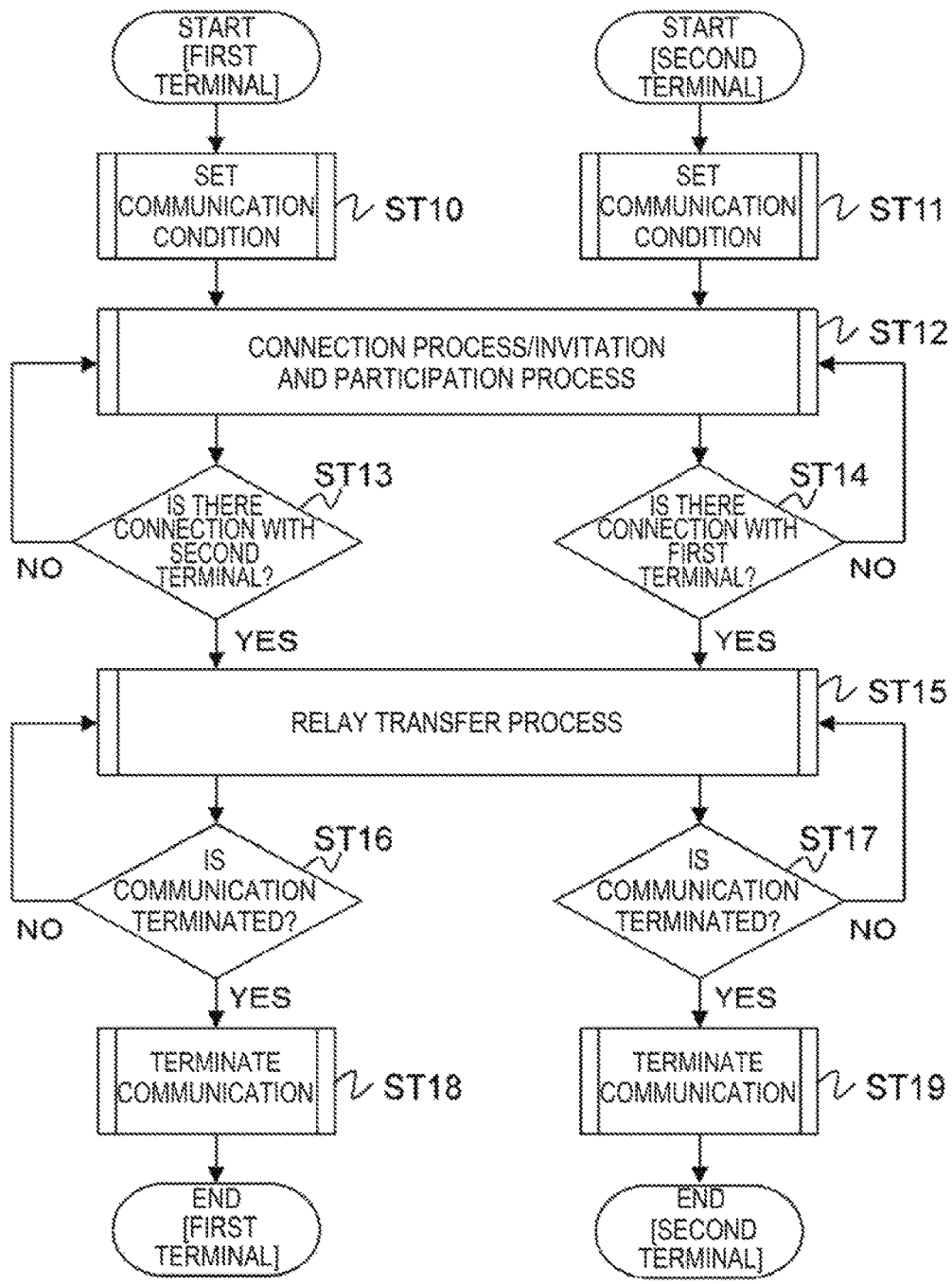
FIG. 5 is a flowchart illustrating an example of a basic procedure of the process by the first terminal and the second terminal in an implementation example.

The flowchart of FIG. 5 illustrates an example of a basic procedure of a process by the first terminal 11 and the second terminal 12 according to the implementation examples. The first terminal 11 sets a communication condition in step ST10. The second terminal 12 sets a communication condition in step ST11. Then, the first terminal 11 and the second terminal 12 perform a connection process or an invitation and participation process in step ST12.

Then, the first terminal 11 determines whether there is a connection with the second terminal 12 in step ST13. If there is a connection, the process proceeds to step ST15. In addition, the second terminal 12 determines whether there is a connection with the first terminal 11 in step ST14. If there is a connection, the process proceeds to step ST15. In step ST15, the first terminal 11 and the second terminal 12 perform a relay transfer process.

Then, the first terminal 11 determines whether to terminate the communication in step ST16. If it is determined that the communication is to be terminated, the communication is terminated in step ST18. In addition, the second terminal 12 determines whether to terminate the communication in step ST17. If it is determined that the communication is to be terminated, the communication is terminated in step ST19.

Figure 6:
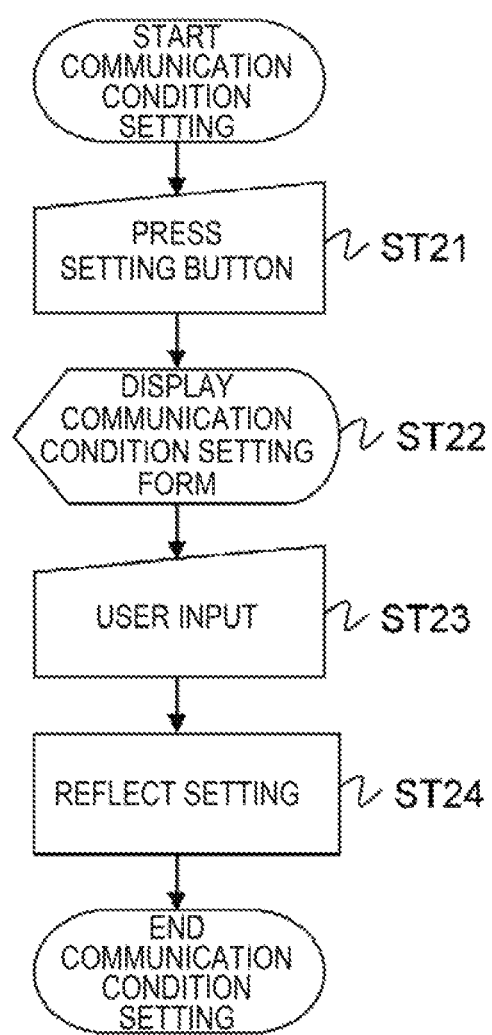
FIG. 6 is a flowchart illustrating an example of the setting process procedure of communication conditions.

The flowchart of FIG. 6 illustrates an example of the procedure of the communication condition setting process in step ST10 and step ST11 in the flowchart of FIG. 5 described above. When the user (terminal user) presses a setting button of the user input unit 102 or 202 in step ST21, a communication condition setting form is displayed on the display 101 or 201 in step ST22. Then, in step ST23, a communication condition is set by the input operation from the user input unit 102 or 202 by the user using the communication condition setting form. Subsequently, in step ST24, the communication condition setting is reflected in each terminal.

Figure 7:
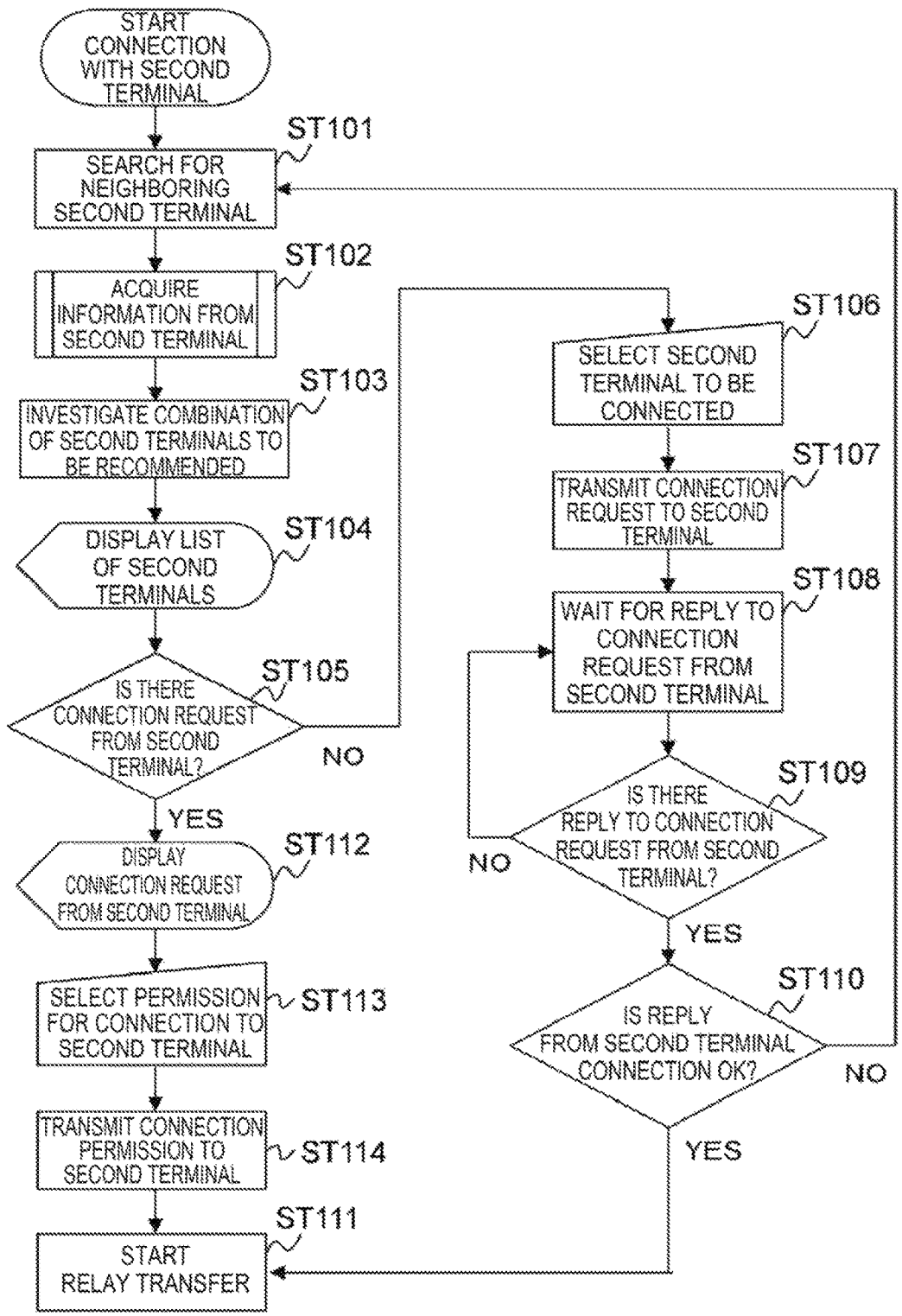
FIG. 7 is a flowchart illustrating an example of the procedure of a process from the connection of the first terminal with the second terminal to the start of relay transfer in the first terminal.

The flowchart of FIG. 7 illustrates an example of the procedure of a process from the connection of the first terminal 11 with the second terminal 12 to the start of relay transfer in the first terminal 11. The first terminal 11 searches for a neighboring second terminal 12 in step ST101. Then, in step ST102, the first terminal 11 acquires information from the second terminal 12 discovered by the search in step ST101.

Figure 8:
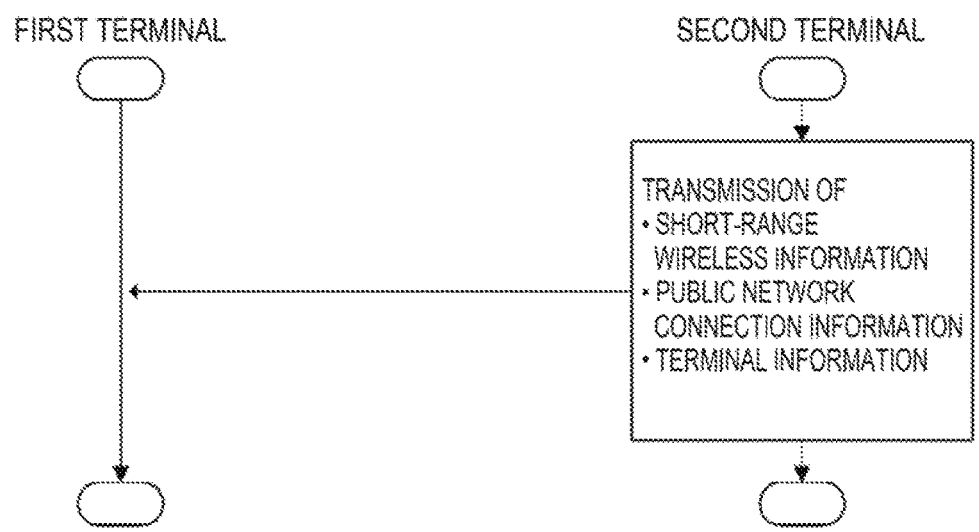
FIG. 8 is a flowchart illustrating an example of the process for transmitting information from the second terminal 1 to the first terminal 11.

The flowchart of FIG. 8 illustrates an example of the process for transmitting information from the second terminal 12 to the first terminal 11 in the process in step ST101. In this case, examples of the information to be transmitted include short-range wireless information, public network connection information, and terminal information. The first terminal 11 is registered in a table (terminal management table) in the memory 106. The FIG. 9 illustrates an example of contents of the table.

Referring back to FIG. 7, then in step ST103, the first terminal 11 investigates a combination of the second terminals 12 to be recommended, that is, which one is recommended as the second terminal 12 to be used for the relay transfer, based on the information acquired in step ST102. Then, in step ST104, the first terminal 11 displays a list of the second terminals 12 discovered by the search in step ST101 on the display 101.

Then, in step ST105, the first terminal 101 determines whether there is a connection request from the second terminal 12. If there is no connection request, when the second terminal 12 to be connected, that is, when the second terminal 12 to be used for the relay transfer is selected by the user operation in step ST106, the first terminal 11 transmits a connection request to the selected second terminal 12 in step ST107.

Then, the first terminal 11 is in the state of waiting for a reply to the connection request from the second terminal 12 in step ST108, and determines whether there is a reply in step ST109. If there is a reply, the first terminal 11 determines whether the reply from the second terminal 12 is connection permission (connection OK) in step ST110. If there is no connection permission, the first terminal 11 returns the process to step ST101 and repeats similar processes to those described above. On the other hand, if there is connection permission, the first terminal 11 starts data transmission (data transfer) by using the second terminal 12 as a relay in step ST111.

In addition, if there is a connection request from the second terminal 12 in step ST105, the first terminal 11 displays the connection request from the second terminal 12 on the display 101 in step ST112. Then, if the permission for connection to the second terminal 12 is selected by the user operation in step ST113, the first terminal 11 transmits the connection permission to the second terminal 12 in step ST114. Then, the first terminal 11 starts data transmission (data transfer) by using the second terminal 12 as a relay in step ST111.

Figure 10:
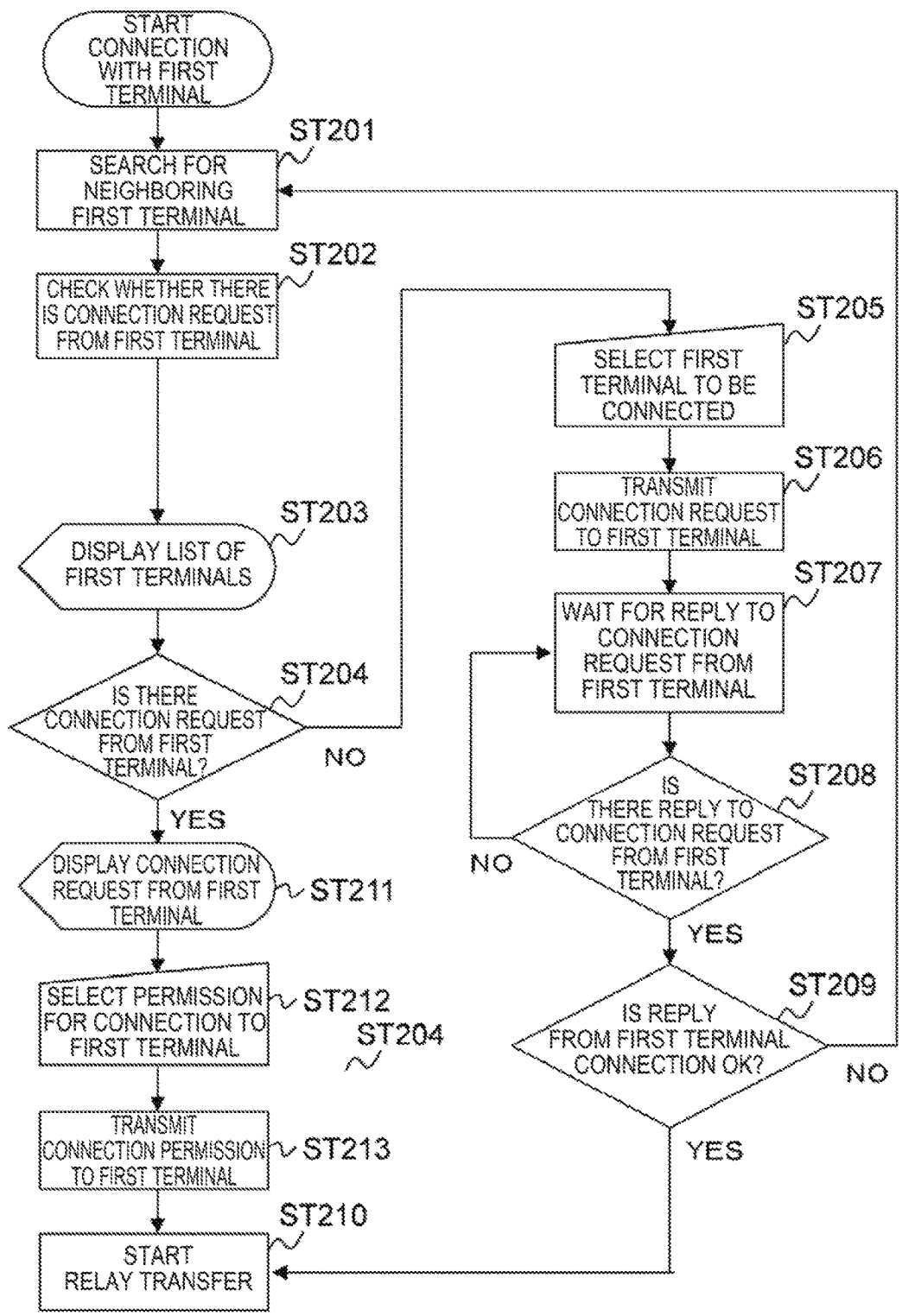
FIG. 10 is a flowchart illustrating an example of the procedure of a process from the connection of the second terminal with the first terminal to the start of relay transfer in the second terminal.

The flowchart of FIG. 10 illustrates an example of the procedure of a process from the connection of the second terminal 12 with the first terminal 11 to the start of relay transfer in the second terminal 12. The second terminal 12 searches for a neighboring first terminal 11 in step ST201. Then, in step ST202, the second terminal 12 checks whether there is a connection request from the first terminal 11 discovered by the search in step ST201.

Then, in step ST203, the second terminal 12 displays a list of the first terminal 11 discovered by the search in step ST201 on the display 201. Then, in step ST204, the second terminal 12 determines whether a connection request from the first terminal 11. If there is no connection request, when the first terminal 11 to be connected, that is, when the first terminal 11 in which its own terminal is to be used for the relay transfer is selected by the user operation in step ST205, the second terminal 12 transmits a connection request to the selected first terminal 11 in step ST206.

Then, the second terminal 12 is in the state of waiting for a reply to the connection request from the first terminal 11 in step ST207, and determines whether there is a reply in step ST208. If there is a reply, the second terminal 12 determines whether the reply from the first terminal 11 is connection permission (connection OK) in step ST209. If there is no connection permission, the second terminal 12 returns the process to step ST201 and repeats similar processes to those described above. On the other hand, if there is connection permission, the second terminal 12 starts to relay data transmission (data transfer) from the first terminal 11 in step ST210.

In addition, if there is a connection request from the first terminal 11 in step ST204, the second terminal 12 displays the connection request from the first terminal 11 on the display 201 in step ST211. Then, if the permission for connection to the first terminal 11 is selected by the user operation in step ST212, the second terminal 12 transmits the connection permission to the first terminal 11 in step ST213. Then, the second terminal 12 starts to relay data transmission (data transfer) from the first terminal 11 in step ST210.

[Implementation Example 1 (For Professional/Cooperator: Specified)]

The implementation example 1 illustrates a case where the application is for professional use and a user is specified. For example, a photographer at an outdoor shooting site is the first terminal's user and photography staff is the second terminal's user. It is assumed that the photographer and the photography staff have previously exchanged information concerning the first terminal 11 and the second terminal 12. In this case, it is assumed that the first terminal 11 is a camera held by the photographer and the second terminal 12 is a business mobile phone held by the photography staff. In this case, it is assumed that there is no necessity to pay the consideration for communication to a cooperator.

Figure 11:
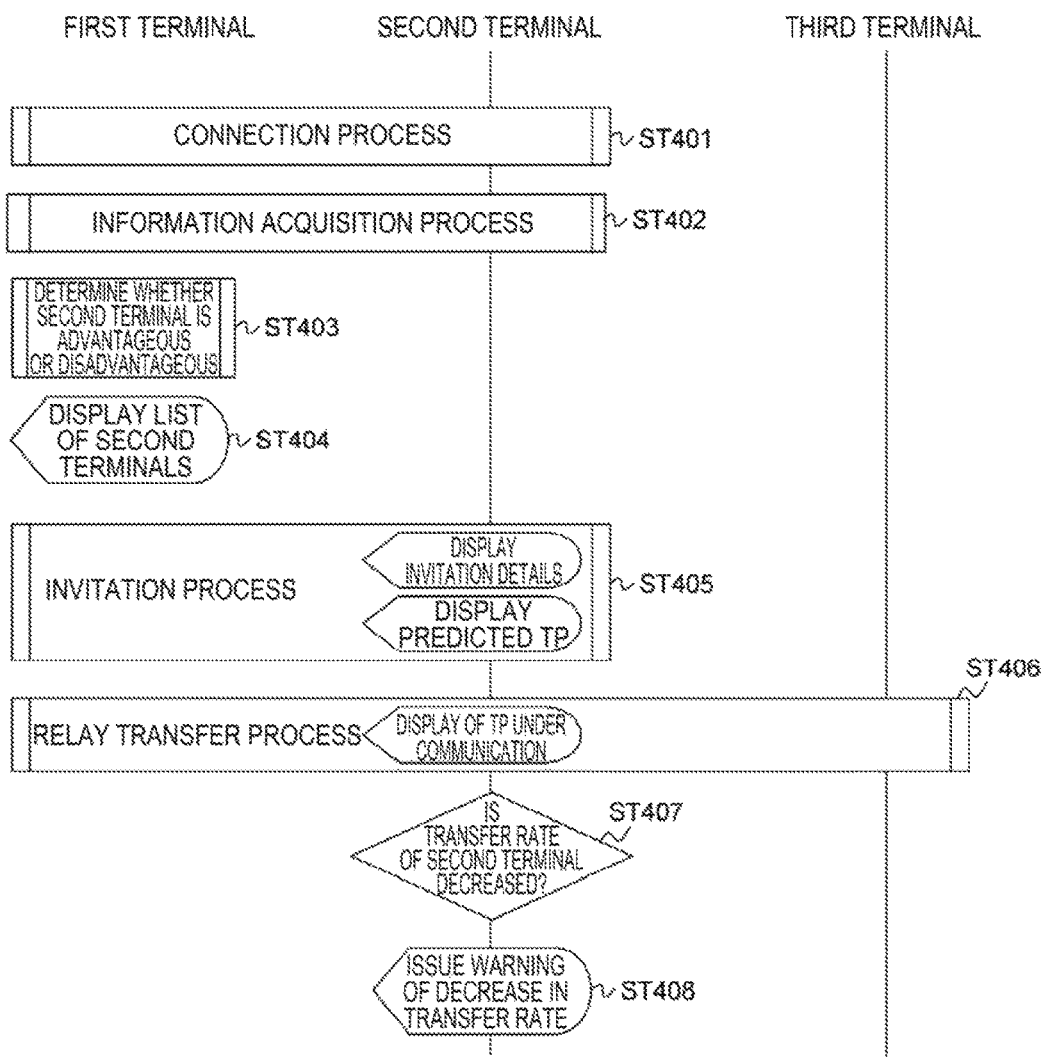
FIG. 11 is a diagram illustrating an example of a process by each terminal in an implementation example 1.

FIG. 11 illustrates an example of a process by each terminal in the implementation example 1. In the implementation example 1, the first terminal 11 invites the second terminal 12. The first terminal 11 is connected to the second terminal 12 discovered by the search started by the photographer's operation in step ST401, and acquires information from the second terminal 12 in step ST402.

Examples of the information to be acquired include those as follows:
(1) Information concerning cooperator
(2) Cellular: Communication protocol
(3) Cellular: Base station parameter
(4) Cellular: Communication quality information (communication speed and congestion status)
(5) Wi-Fi: Capability
(6) Wi-Fi: Communication quality (actual TP, CCA rate, RSSI, modulation, retransmission rate)
(7) Remaining battery level of second terminal The first terminal 11 causes information acquired from the second terminal 12 to be stored in a table (terminal management table) of the memory 106 (see FIG. 9).

Figure 12:
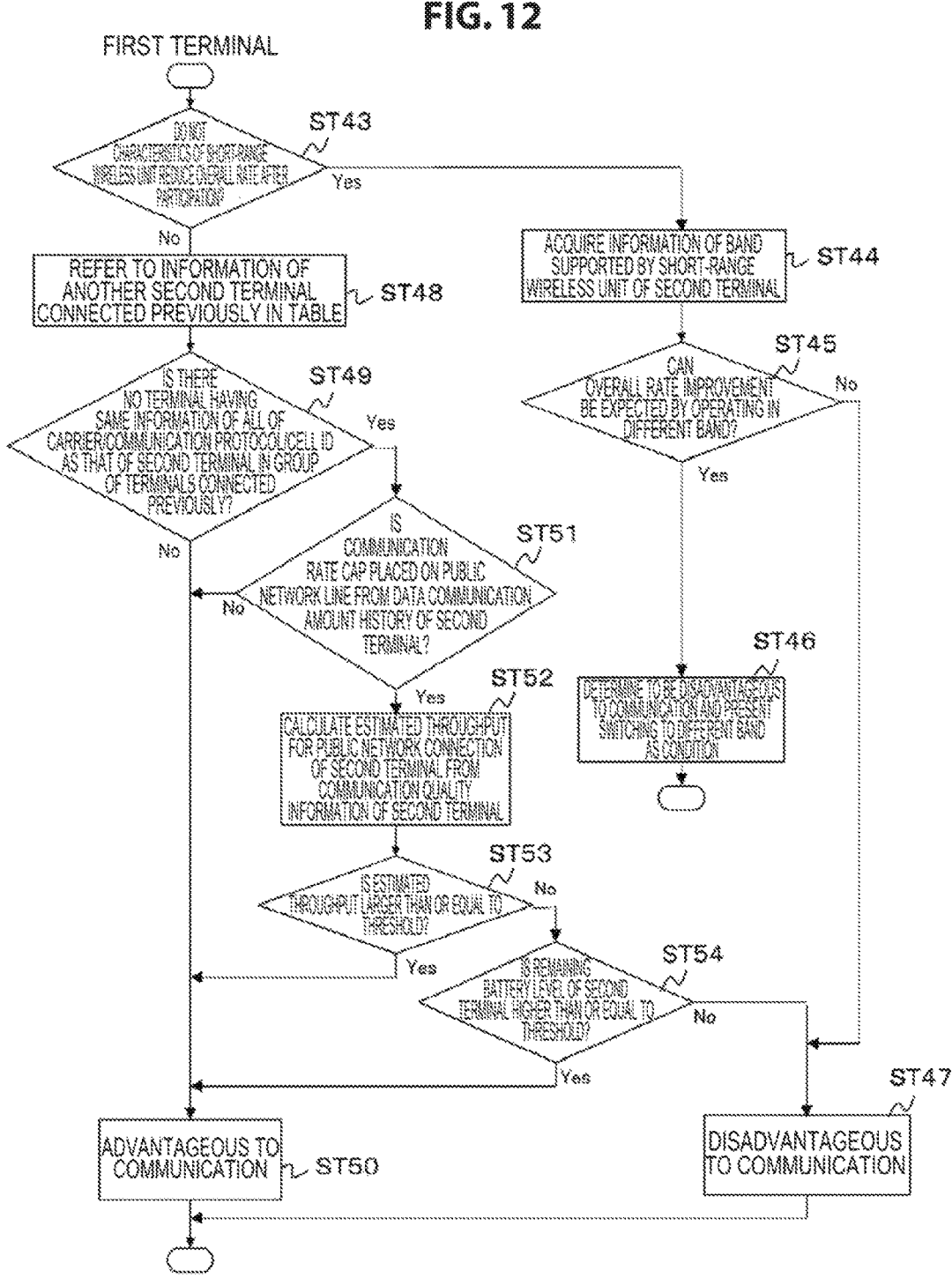
FIG. 12 is a flowchart illustrating an example of an advantage or disadvantage determination process.

Then, in step ST403, the first terminal 11 determines whether the second terminal 12 is advantageous or disadvantageous for each of them based on the information acquired from each of the second terminals 12. The flowchart of FIG. 12 illustrates an example of the advantage or disadvantage determination process.

In step ST43, the first terminal 11 estimates the transmission rate available in the short-range wireless unit from any one or multiple of information indicating the link quality and determines whether the characteristics of the short-range wireless unit do not reduce the overall rate after the participation. This is because, in the case where a plurality of the second terminals 12 share radio resources of the short-range wireless unit, the participation of the second terminal 12 having poor quality of the short-range wireless unit may decrease the overall total transfer rate regardless of transmission characteristics of the public network. However, even when the link quality (estimated transmission rate) of the short-range wireless unit does not satisfy a predetermined threshold, it is possible to avoid a burden of radio resources as long as the first terminal 11 and the second terminal 12 perform an operation on a different frequency band. Thus, it is more likely to improve the overall total transfer rate.

If the overall rate is determined to decrease after the participation in step ST43, the first terminal 11 acquires information of a band supported by the second terminal 12 in step ST44. Then, in step ST45, it is determined whether the overall rate improvement can be expected by operating in a different band. If the overall rate improvement can be expected, the first terminal 11 determines to be "disadvantageous to communication" in step ST46, and presents the switching to the different band as a condition. On the other hand, if the overall rate improvement fails to be expected, the first terminal 11 determines to be "disadvantageous to communication" in step ST47.

In addition, if the overall rate is not determined to decrease after the participation in step ST43, the process proceeds to step ST48 by the first terminal 11. In step ST48, the first terminal 11 refers to information in the table that is related to a different second terminal 12 previously connected. Then, in step ST49, the first terminal 11 checks whether there is no second terminal 12 previously connected having the same information including all of the common carrier, communication protocol (e.g., W-CDMA/LTE/WiMAX), and cell identifier of the public wireless network connected to the second terminal 12. If any one of the information is different, the public radio resources may be more likely to be combined without affecting each other. If it is determined that there is no terminal previously connected having all the same information, the first terminal 11 determines to be "advantageous to communication" in step ST50.

If there is the second terminal 12 previously connected having all the same connection information of the public wireless network, radio resources are divided for each public network portion and the existing trunk circuit is likely to be affected, and thus it is possible to perform the determination in more detail. In this case, if it can be estimated that a cap is placed on the data communication rate from the transition information of the past data communication amount of the second terminal 12, it is expected that no significant influence on the existing trunk circuit even when the participation is allowed in the transfer. In the case where even the condition described above is not satisfied, it is difficult to expect to substantially improve the transfer rate for all the terminals if the transfer participation is accepted. In such a case, a significant effect on the power consumption of the second terminal 12 is difficult to be achieved.

If it is determined in step ST49 that there is a terminal previously connected having all the same information, the process proceeds to step ST51 by the first terminal 11. In this step ST51, the first terminal 11 determines whether the communication rate cap is placed on the public network line from the data communication amount history of the second terminal 12. If it is not determined that the communication rate cap is placed on the public network line, the first terminal 11 determines to be "advantageous to communication" in step ST50.

In addition, if it is determined in step ST51 that the communication rate cap is placed on the public network line, the first terminal 11 calculates an estimated throughput for the public network connection of the second terminal 12 from the communication quality information of the second terminal 12 in step ST52. Then, the first terminal 11 determines whether the estimated throughput is larger than or equal to a threshold in step ST53. If it is determined that the estimated throughput is larger than or equal to the threshold, the first terminal 11 determines to be "advantageous to communication" in step ST50.

In addition, if it is not determined in step ST53 that the estimated throughput is larger than or equal to the threshold, the first terminal 11 determines whether the remaining battery level of the second terminal 12 is higher than or equal to a threshold in step ST54. If the remaining battery level is higher than or equal to the threshold, the first terminal 11 determines to be "advantageous to communication" in step ST50. On the other hand, if the remaining battery level is lower than the threshold, the first terminal 11 determines to be "disadvantageous to communication" in step ST47.

Figure 13:
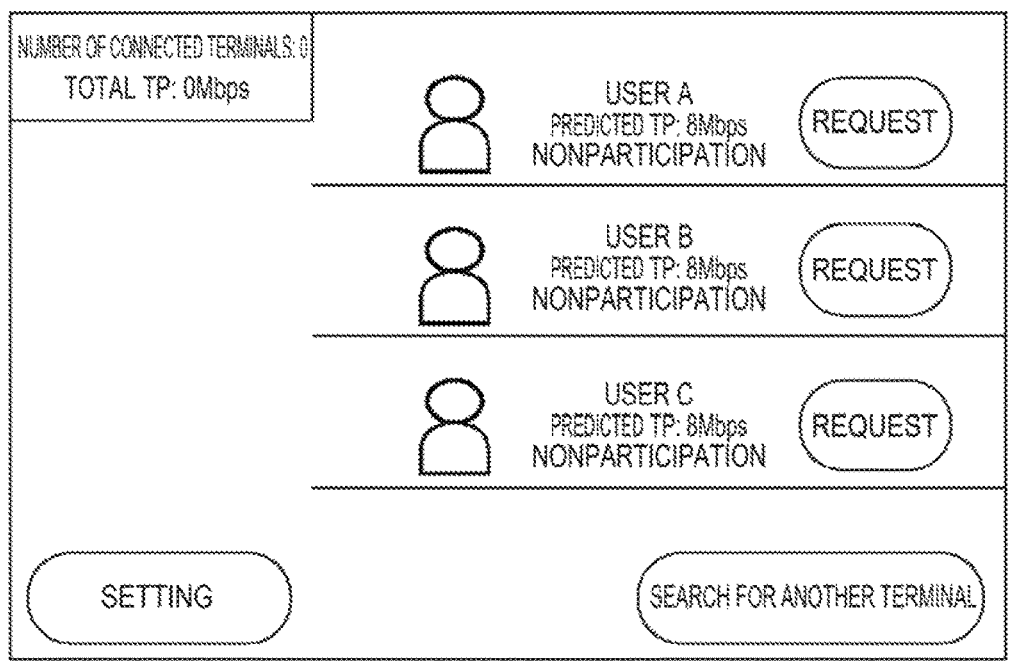
FIG. 13 is a diagram illustrating an example of a screen of the first terminal.

Referring back to FIG. 11, in step ST404, the first terminal 11 displays the list of the second terminals 12 discovered by the search on the display 101 and presents it to the photographer. FIG. 13 illustrates an example of a screen of the first terminal 11. This screen further displays user information "USER A, USER B, USER C", predicted transfer rate (TP: throughput) information, and information indicating participation or nonparticipation in relay transfer, which are associated with each of the second terminals 12 in the list. This screen also displays buttons including "REQUEST", "SEARCH FOR ANOTHER TERMINAL", and "SETTING" buttons.

Figure 14:
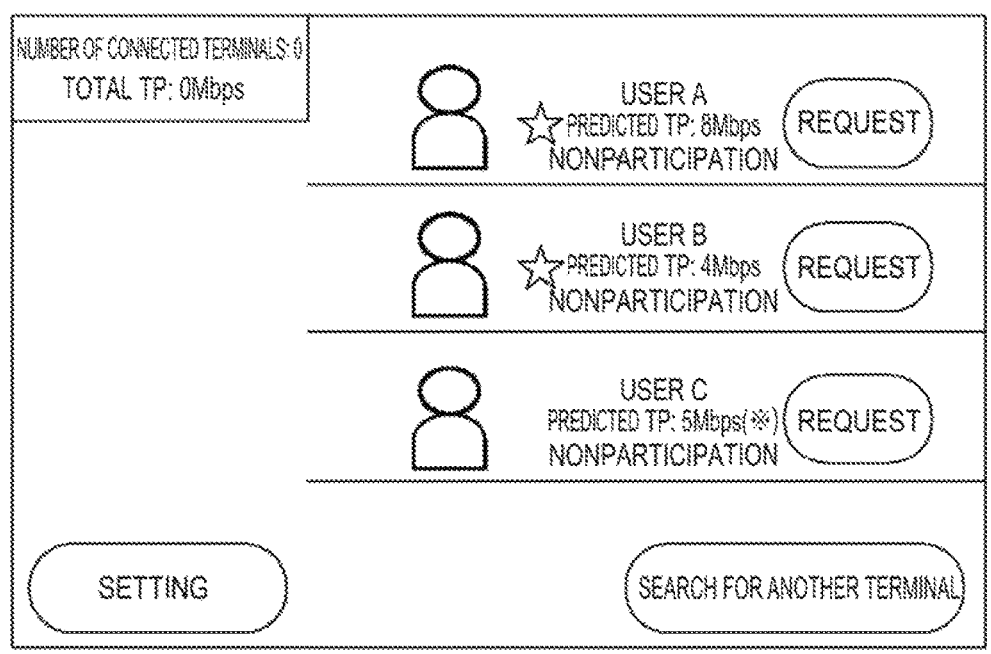
FIG. 14 is a diagram illustrating an example of a screen (screen showing a recommendation of combination of users) of the first terminal 11.

FIG. 14 illustrates an example of another screen of the first terminal 11. This screen displays an asterisk indicating that the selection is recommended, which is associated with the second terminal 12 determined to be advantageous based on the determination of advantage or disadvantage obtained by the process of step ST403, in addition to those in the screen of FIG. 13. The recommendation of selection can be displayed using any other display marks, not limited to the asterisk. For example, the portion of the second terminal 12 in which the selection is recommended may be displayed, as a text highlighted by bold font, a text filled by specified color, using other marks than the asterisk, or even using the wording recommending the selection.

Then, in step ST405, the photographer serving as the user of the first terminal 11 operates the user input unit 102, selects a second terminal 12 to be used for relaying, and transmits a connection request to the second terminal 12. The connection request includes, for example, user information, predicted transfer rate (TP) information, user information of another second terminal 12 previously connected, connection condition information, or the like, as additional information.

Figure 15:
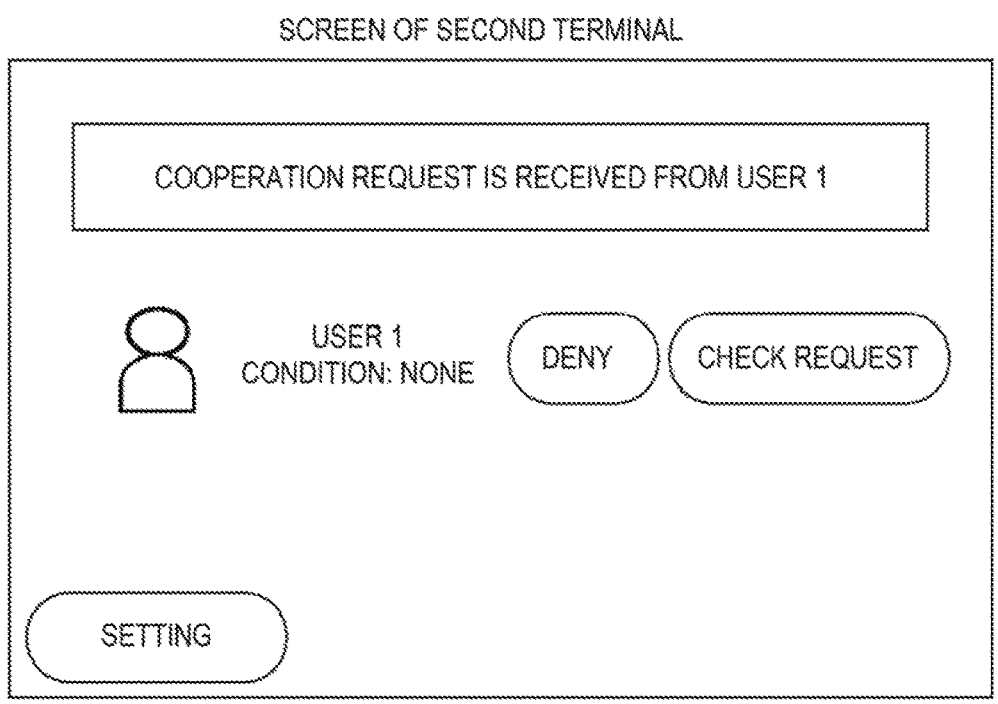
FIG. 15 is a diagram illustrating an example of a screen of the second terminal.

In this case, the second terminal 12 displays invitation details on the display 201. In this context, the reception of the connection request from the first terminal 11 is displayed, in addition to the user information, connection condition, and predicted transfer rate (TP) of the first terminal 11. FIG. 15 illustrates an example of a screen of the second terminal 12. This screen displays a message "CONNECTION REQUEST IS RECEIVED FROM USER 1", and displays the user information "USER 1" and connection condition "CONDITION: NONE" of the first terminal 11.

Figure 16:
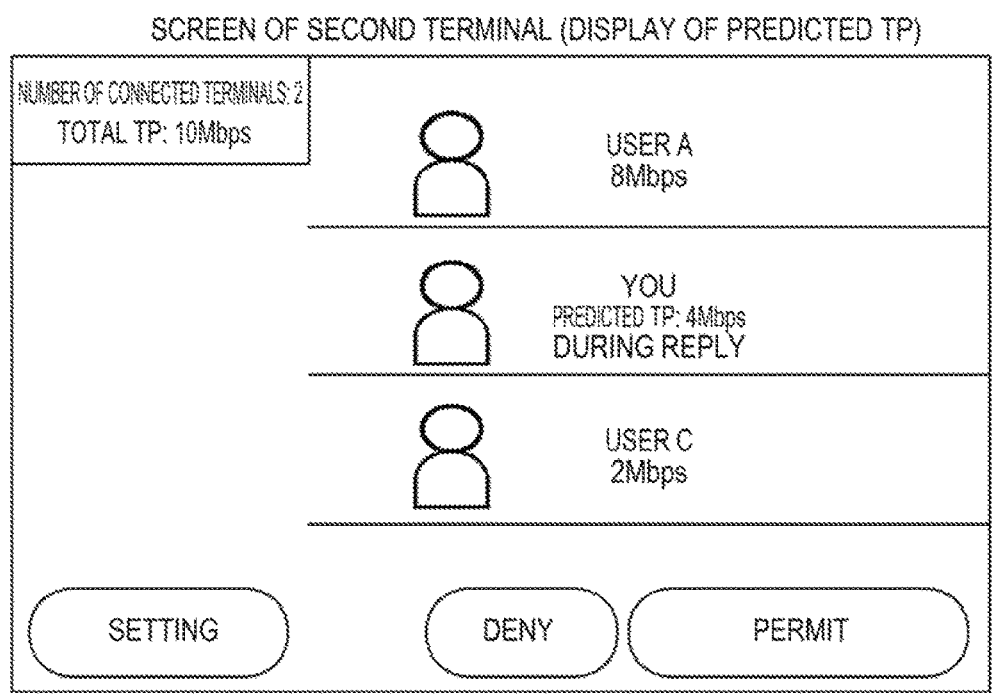
FIG. 16 is a diagram illustrating an example of a screen (display of predicted TP) of the second terminal.

In addition, this screen displays buttons such as "DENY", "CHECK REQUEST", and "SETTING" buttons. The cooperator serving as the user of the second terminal 12 can check the prediction of influence on the data transfer when the second terminal 12 of the cooperator participates in the relay transfer by operating the button "CHECK REQUEST". FIG. 16 illustrates an example of a screen of the second terminal 12 in the case described above. This screen displays the user information, transfer rate information, or the like of all the second terminals 12 including the second terminal 12 previously connected. In addition, buttons including "DENY", "PERMIT", and "SETTING" buttons are also displayed.

In addition, in this case, the cooperator serving as the user of the second terminal 12 decides whether to participate in the relay transfer. When participation is denied, the button "DENY" is operated. When participation is permitted, the button "PERMIT" is operated. The second terminal 12 transmits a result obtained by the selection to permit or deny participation to the first terminal 11 as a reply to the connection request. In this case, the first terminal 11 displays the result obtained by the selection to permit or deny participation in the second terminal 12 on the display 101 and presents it to the photographer serving as the user of the first terminal 11.

Then, in step ST406, the first terminal 11 starts data transmission (data transfer) using the second terminal 12 as a relay. In this case, the first terminal 11 displays the list of the second terminals 12 connected thereto and a transfer rate (TP) in association with each of the second terminals 12 on the display 101. This allows the photographer serving as the user of the first terminal 11 to check the transfer rate (TP) of the respective the second terminals 12. In this case, the list of the second terminals 12 may be displayed in rearranged order according to the transfer rate.

In this case, the data transmitted from the first terminal 11 to the second terminal 12 includes, for example, the user information and transfer rate (TP) information of the respective second terminals 12 and the user information of another second terminal 12 previously connected, which participate in the relay transfer, as additional information. The second terminal 12 displays the list of the second terminals 12 connected thereto and the respective transfer rate (TP) on the display 201. This allows the cooperator serving as the user of the second terminal 12 to check the transfer rate (TP) of the respective second terminals 12. In this case, the relationship between the second terminal 12 of the cooperator and the second terminal 12 of another cooperator can be checked.

Figure 17:
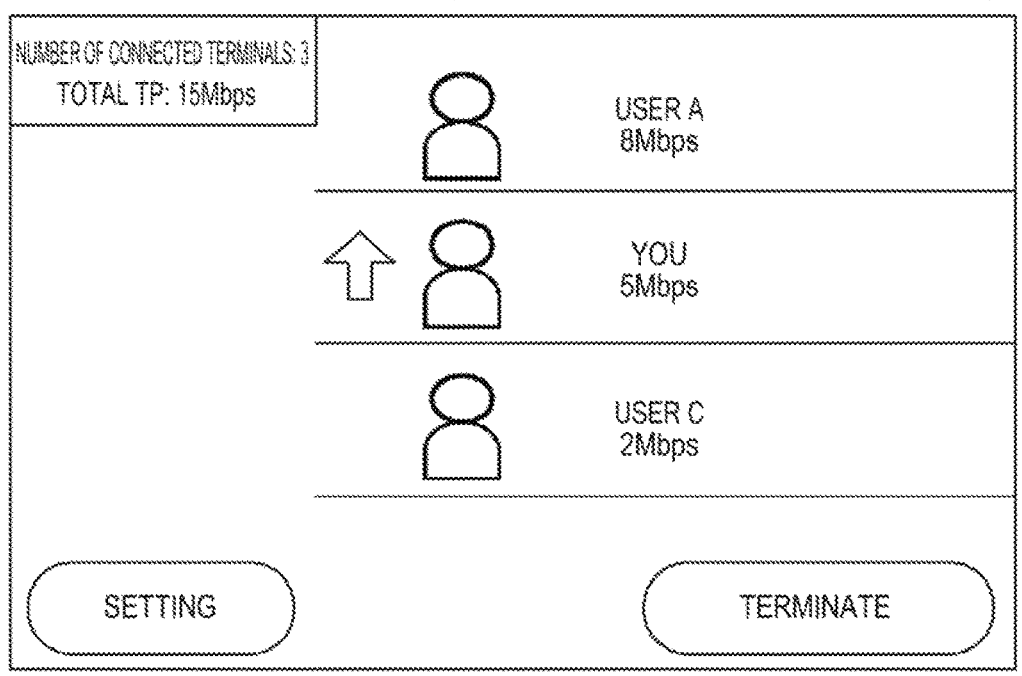
FIG. 17 is a diagram illustrating an example of a screen (display of TP under communication) of the second terminal.

FIG. 17 illustrates an example of a screen of the second terminal 12 in the case described above. This screen displays the listed three second terminals 12 and displays user information, transfer rate (TP) information, or the like of each of them. This screen shows that a user oneself is faster in transfer rate (TP) than user C and is significantly influenced when moving away (withdrawal) from data transfer. This screen also displays buttons including "TERMINATE" and "SETTING" buttons.

Figure 18:
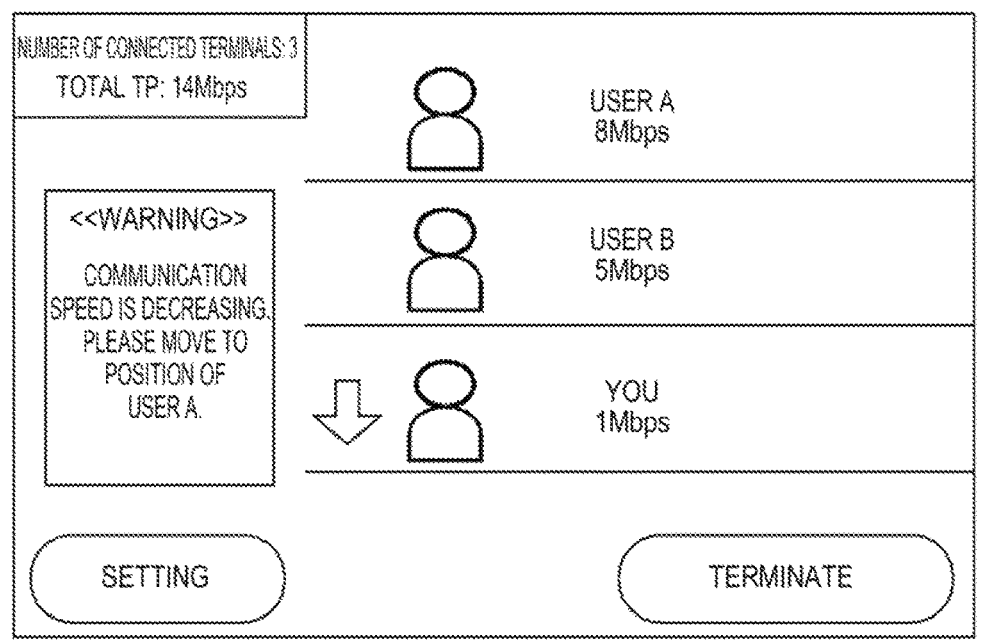
FIG. 18 is a diagram illustrating an example of a screen (in case of decrease in communication speed) of the second terminal.
Figure 19:
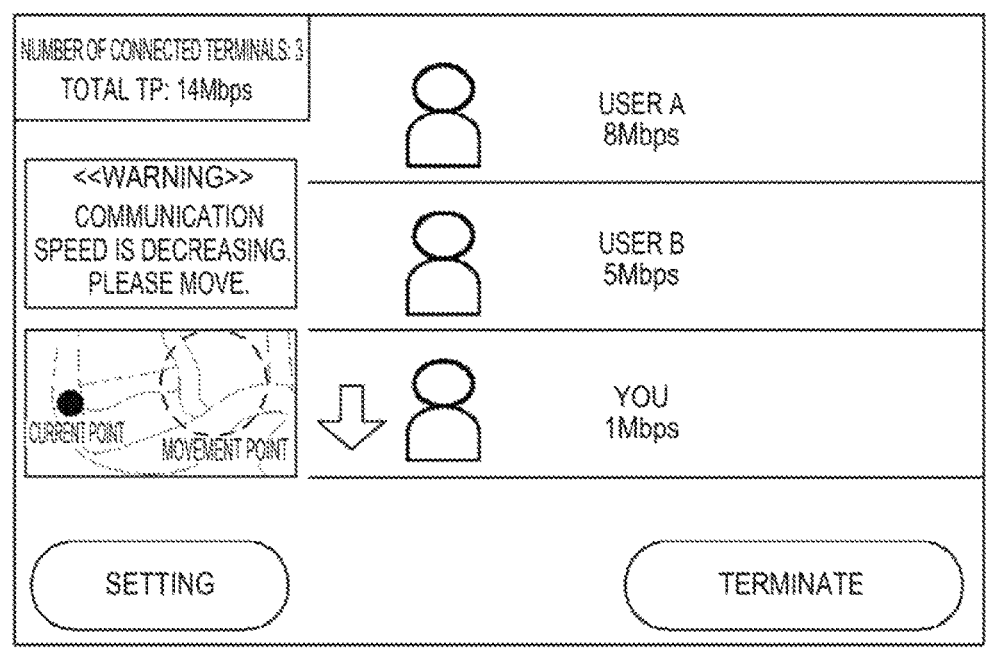
FIG. 19 is a diagram illustrating an example of a screen (prompting to move its position in case of decrease in communication speed) of the second terminal.

Next, in step ST407, the second terminal 12 determines whether the transfer rate (TP) decreases. Then, if the transfer rate (TP) decreases, in step ST408, the second terminal 12 displays a warning message on the display 201 and presents it to the cooperator serving as the user of the second terminal 12. FIG. 18 illustrates an example of a screen of the second terminal 12 in the case described above. This screen displays a message that prompts to move its position in addition to the warning message. FIG. 19 is also an example of a similar screen to the FIG. 18, but displays a location to which a user of the second terminal 12 should move using a map, not using a message.

[Implementation Example 2 (For Professional/Cooperator: Unspecified Persons)]

The implementation example 2 illustrates a case where the application is for professional use and cooperators are unspecified persons. For example, it is implemented by assuming a case in which a photographer at an outdoor shooting site requests surrounding other people to cooperate in the transfer. In this case, the photographer is the user of the first terminal and the surrounding other people is the user of the second terminal. The first terminal 11 is a camera held by the photographer and the second terminal is a personal mobile phone held by the surrounding other people.

Figure 20:
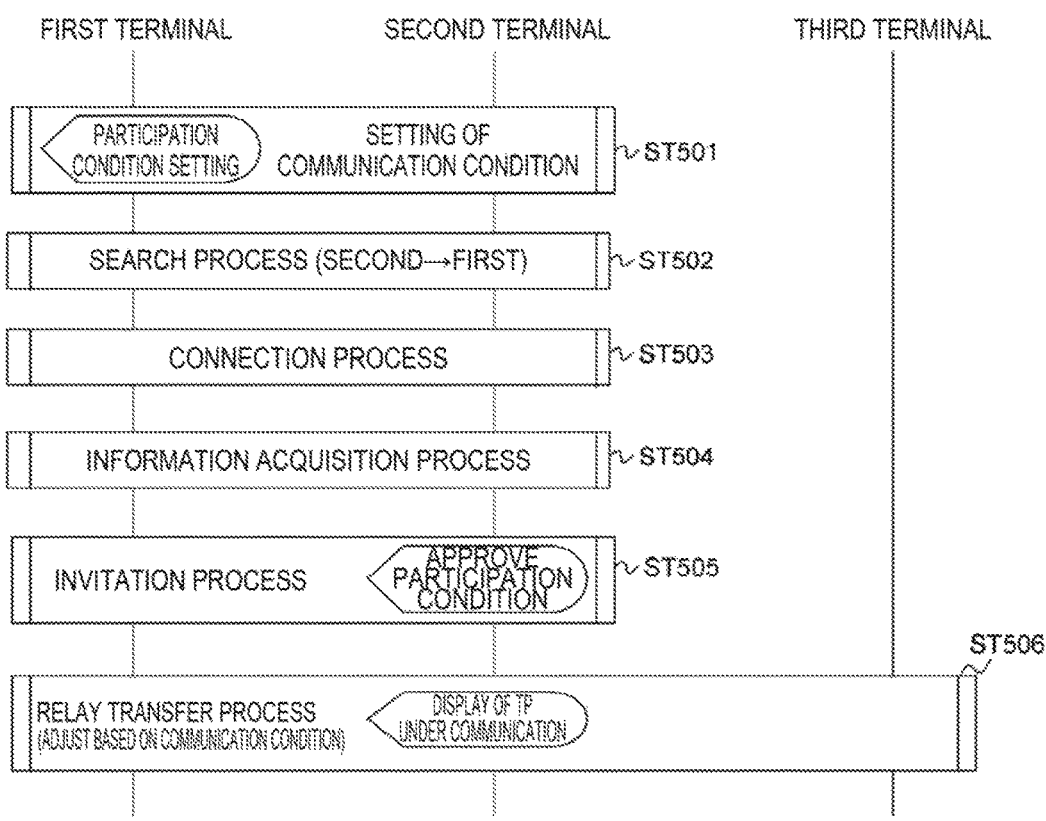
FIG. 20 is a diagram illustrating an example of a process by each terminal in an implementation example 2.

FIG. 20 illustrates an example of a process by each terminal in the implementation example 2. In the implementation example 2, the user of the first terminal 11 and the user of the second terminal 12 do not exchange information concerning the first terminal 11 and the second terminal 12 with each other. It is assumed that the user of the first terminal provides an incentive to the user of the second terminal.

In step ST501, the first terminal 11 and the second terminal 12 set a communication condition. In this case, the first terminal 11 can set a participation condition (request condition) of the user of the second terminal 12 using a communication condition setting form displayed on the display 101.

Examples of the participation condition that can be set include those as follows:

(1) Participation possible time (connected for at least more than 30 minutes)
(2) Transferrable communication amount (transferable up to 2 GByte)
(3) Wi-Fi Capability (only 5 GHz)
(4) Reward In addition, examples of contents of the settable reward include those as follows:

(1) Point
(2) Cash back

Figure 21:
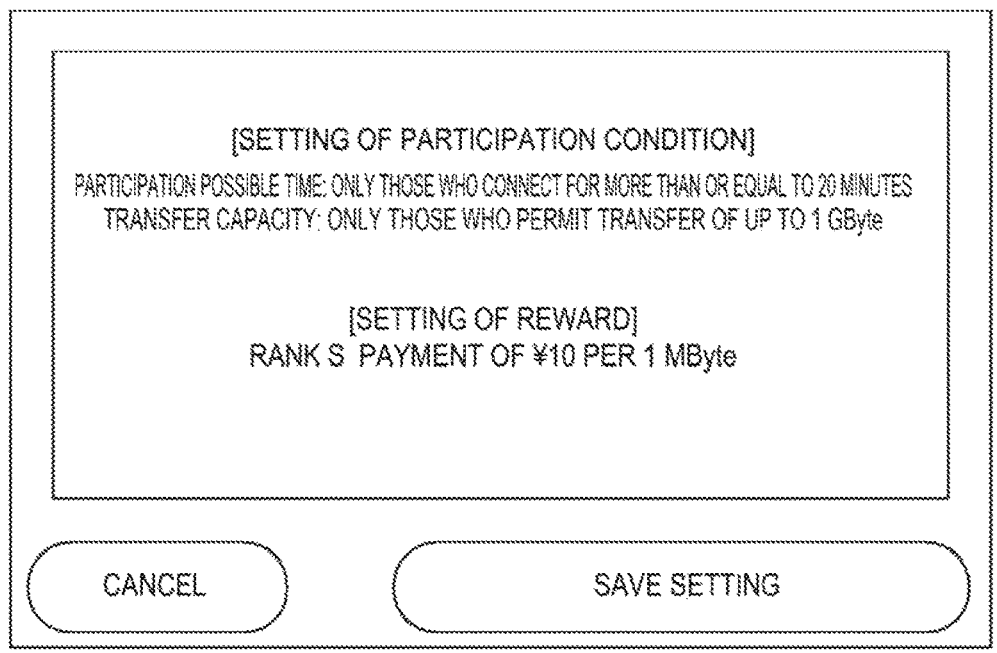
FIG. 21 is a diagram illustrating an example of a participation condition setting screen of the first terminal.

FIG. 21 illustrates an example of a participation condition setting screen of the first terminal 11. In this example, the participation possible time and the transfer capacity (transferrable communication amount) are set in "PARTICIPATION CONDITION SETTING". In this example, the payment of 10 Japanese yen per 1 Mbps is set in "REWARD SETTING". In addition, buttons "CANCEL" and "SAVE SETTING" are set in this screen.

Then, in step ST502, when the user of the second terminal starts the second terminal 12, the second terminal 12 searches for a neighboring first terminal 11. Then, the second terminal 12 is connected to the first terminal 11 discovered by the search in step ST503, and acquires information from the first terminal 11 in step ST504.

Next, in step ST505, the second terminal 12 displays the list of the first terminal 11 discovered by the search on the display 201 and presents it to the user of the second terminal. This display allows the user of the second terminal to check a cooperation target. In this case, the second terminal 12 can display the participation condition (request condition) that is set in the first terminal 11 on the display 201 through the operation of the user input unit 202 by the user of the second terminal. This display allows the user of the second terminal to check the participation condition (request condition).

Figure 22:
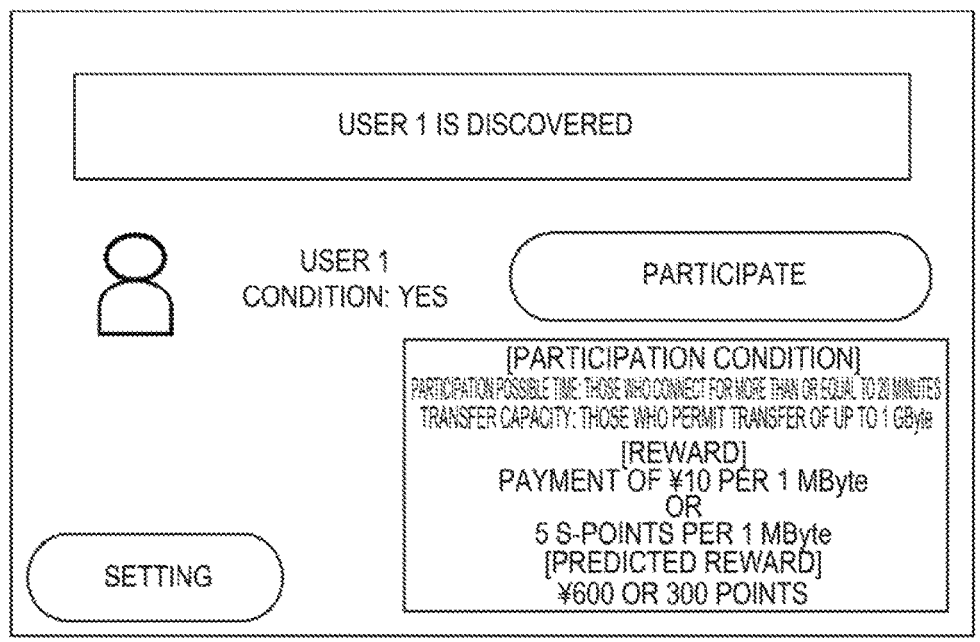
FIG. 22 is a diagram illustrating an example of a participation condition check screen of the second terminal.

FIG. 22 illustrates an example of a participation condition check screen of the second terminal 12. This screen displays a message "USER 1 IS DISCOVERED", and displays the user information "USER 1" and connection condition "CONDITION: NONE" of the first terminal 11. Furthermore, this screen displays a participation condition, rewards, predicted rewards, or the like. In addition, this screen displays buttons "PARTICIPATE" NOT PARTICIPATE", "SETTING", or the like.

In this case, the user of the second terminal decides to participate in the relay transfer or not. If there is no intention to participate, the button "NOT PARTICIPATE" is operated. If there is intention to participate, the button "PARTICIPATE" is operated. The second terminal 12 transmits a participation request to the first terminal 11 when it participates. The first terminal 11 displays the participation request from the second terminal 12 on the display 101 and presents it to the photographer serving as the user of the first terminal 11. In this case, the predicted transfer rate (TP) of the second terminal 12 or the estimated cost incurred by using the second terminal 12 as a relay can be displayed. In addition, in this case, the second terminal 12 that is advantageous to communication can be highlighted based on the information acquired from each of the second terminals 12.

The first terminal 11, when receiving the participation request from the second terminal 12, decides to permit or deny the request. The first terminal 11 notifies the second terminal 12 of a result (permission/denial) to the participation request. Then, in step ST506, the first terminal 11 starts data transmission (data transfer) using the second terminal 12 as a relay. In this case, the second terminal 12 displays its transfer rate (TP) or the like on the display 201 and presents it to the user of the second terminal.

Figure 23:
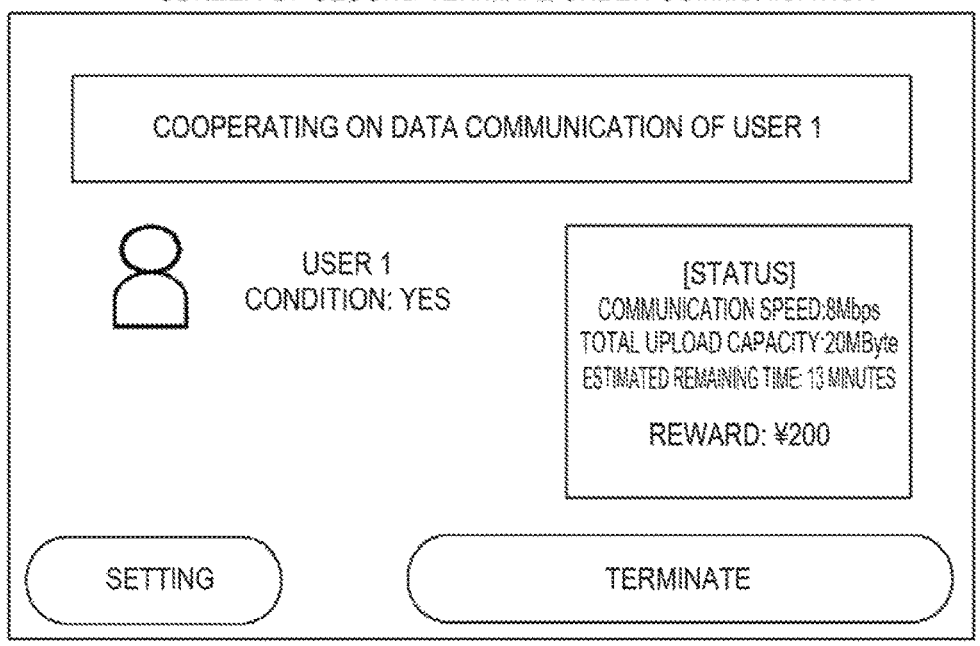
FIG. 23 is a diagram illustrating an example of a screen of the second terminal under communication.

FIG. 23 illustrates an example of a screen of the second terminal 12 in the case described above. This screen displays a message "COOPERATING ON DATA COMMUNICATION OF USER 1", and displays the user information "USER 1" and connection condition "CONDITION: NONE" of the first terminal 11. In addition, the screen displays a state "STATUS" related to the relay transfer. Examples of items of the status include those as follows:

(1) Communication speed
(2) Total transfer amount
(3) Reward

In addition, in this case, the first terminal 11 can display the transfer rate or the like of the second terminal 12 on the display 101 and can present it to the photographer serving as the user of the first terminal. Examples of items to be presented for each cooperator or further for all of them in this case include those as follows:

(1) Communication speed
(2) Total transfer amount
(3) Cost

[Implementation Example 3 (For Consumer/Cooperator: Specified)]

The implementation example 3 illustrates a case where the application is for a consumer and a cooperator is specified. For example, it is assumed that, during overseas travel with friends, uploading photos and movies is performed in cooperation with friends. In this case, one of friends is the user of the terminal and other friends are the users of the second terminals. This example illustrates a case where the friends share the cost for communication.

Figure 24:
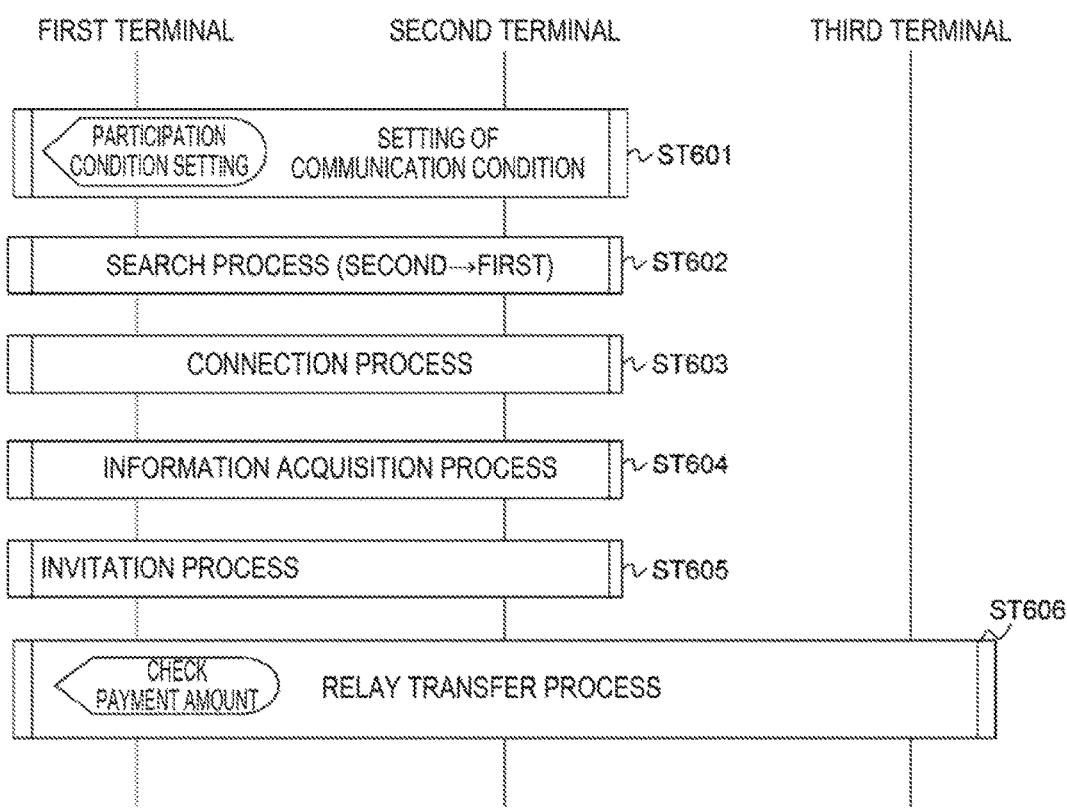
FIG. 24 is a diagram illustrating an example of a process by each terminal in an implementation example 3.

FIG. 24 illustrates an example of a process by each terminal in the implementation example 3. In step ST601, the first terminal 11 and the second terminal 12 set a communication condition. In this case, the user of the first terminal operates the first terminal 11 to enable a communication condition with a cooperator to be set.

Figure 25:
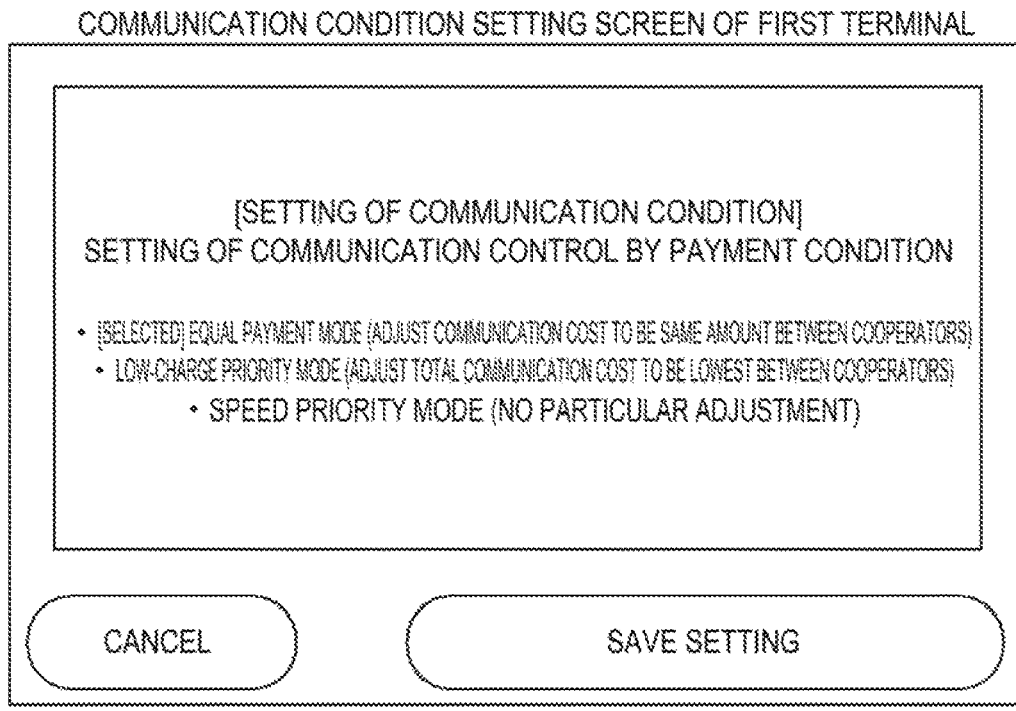
FIG. 25 is a diagram illustrating an example of a communication condition setting screen of the first terminal.

Examples of communication conditions that can be set in this case include those as follows:

(1) Equal payment mode: adjust communication cost to be same amount between cooperators
(2) Low-charge priority mode: adjust total communication cost to be lowest between cooperators
(3) Speed priority mode: perform transfer with best effort by all FIG. 25 illustrates an example of a communication condition setting screen of the first terminal 11. In this example, the equal payment mode is selected. This screen displays buttons including "CANCEL" and "SAVE SETTING" buttons.

In addition, in this case, the first terminal 11 can also set a participation condition (request condition) of the user of the second terminal 12 using a communication condition setting form displayed on the display 101. The settings of the participation condition (request condition) are similar to the above-described implementation example 2.

Then, in step ST602, when the user of the second terminal starts the second terminal 12, the second terminal 12 searches for a neighboring first terminal 11. Then, the second terminal 12 is connected to the first terminal 11 discovered by the search in step ST603, and acquires information from the first terminal 11 in step ST604.

Next, in step ST605, the second terminal 12 displays the list of the first terminal 11 discovered by the search on the display 201 and presents it to the user of the second terminal. This display allows the user of the second terminal to check a cooperation target. In this case, the second terminal 12 can display the communication condition or participation condition (request condition) that is set in the first terminal 11 on the display 201. This display allows the user of the second terminal to check the communication condition or participation condition (request condition) that is set in the first terminal 11.

In addition, in this case, the user of the second terminal decides to participate in the relay transfer or not. If there is intention to participate, the second terminal 12 transmits a participation request to the first terminal 11. The first terminal 11 displays the participation request from the second terminal 12 on the display 101 and presents it to the photographer serving as the user of the first terminal 11. In this case, the predicted transfer rate (TP) of the second terminal 12 or the estimated cost incurred by using the second terminal 12 as a relay can be displayed. In addition, in this case, the second terminal 12 that is advantageous to communication can be highlighted based on the information acquired from each of the second terminals 12.

The first terminal 11, when receiving the participation request from the second terminal 12, decides to permit or deny the request. The first terminal 11 notifies the second terminal 12 of a result (permission/denial) to the participation request. Then, in step ST606, the first terminal 11 starts data transmission (data transfer) using the second terminal 12 as a relay. In this case, the second terminal 12 displays its transfer rate (TP) or the like on the display 201 and presents it to the user of the second terminal.

Figure 26:
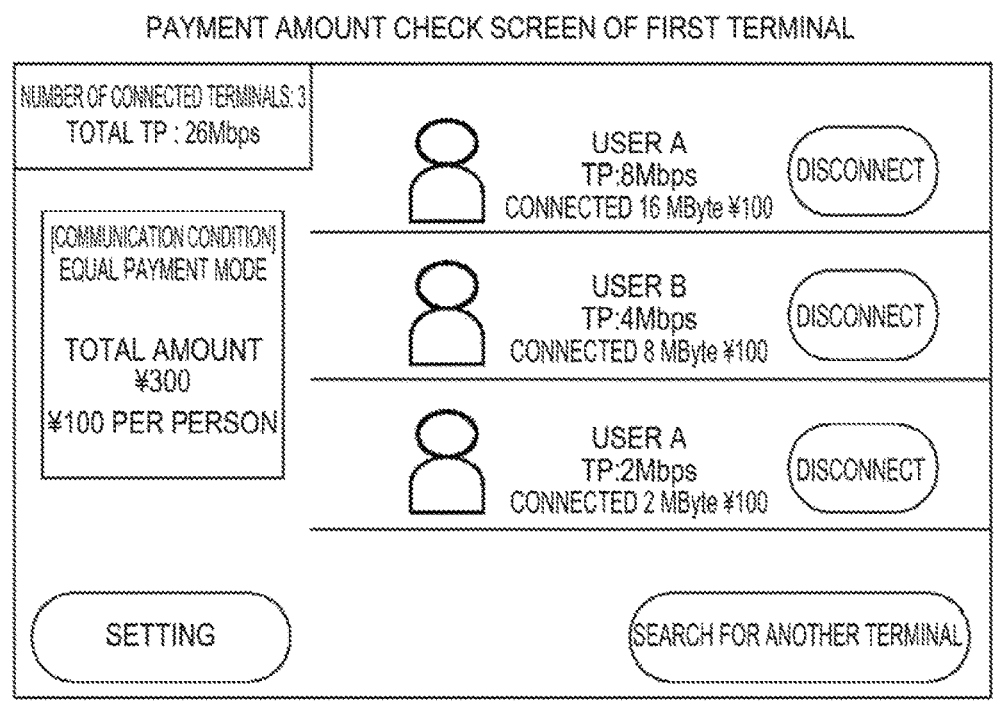
FIG. 26 is a diagram illustrating an example of a payment amount check screen of the first terminal.

Examples of items to be presented in this case include those as follows:
(1) Communication speed
(2) Total transfer amount
(3) Reward In addition, in this case, the first terminal 11 can display the transfer rate or the like of the second terminal 12 on the display 101 and can present it to the photographer serving as the user of the first terminal. FIG. 26 illustrates an example of a payment amount check screen of the first terminal 11 in the case described above. Examples of items to be presented for each cooperator or further for all of them in this case include those as follows:
(1) Communication speed
(2) Total transfer amount
(3) Cost

[Implementation Example 4 (For Consumer/Cooperator: Unspecified Persons)]

The implementation example 2 illustrates a case where the application is for consumer and cooperators are unspecified persons. When the real-time delivery is used at outdoor or at the time of an event, a case where unspecified viewers at the site are requested to cooperate in distribution is assumed. This is when the user of the first terminal pays the consideration to the user of the second terminal. In this case, the consideration is paid in points or cash, or it is assumed that the delivery of content in shooting or distributing or the delivery of content held by the first terminal is implemented as the consideration.

Figure 27:
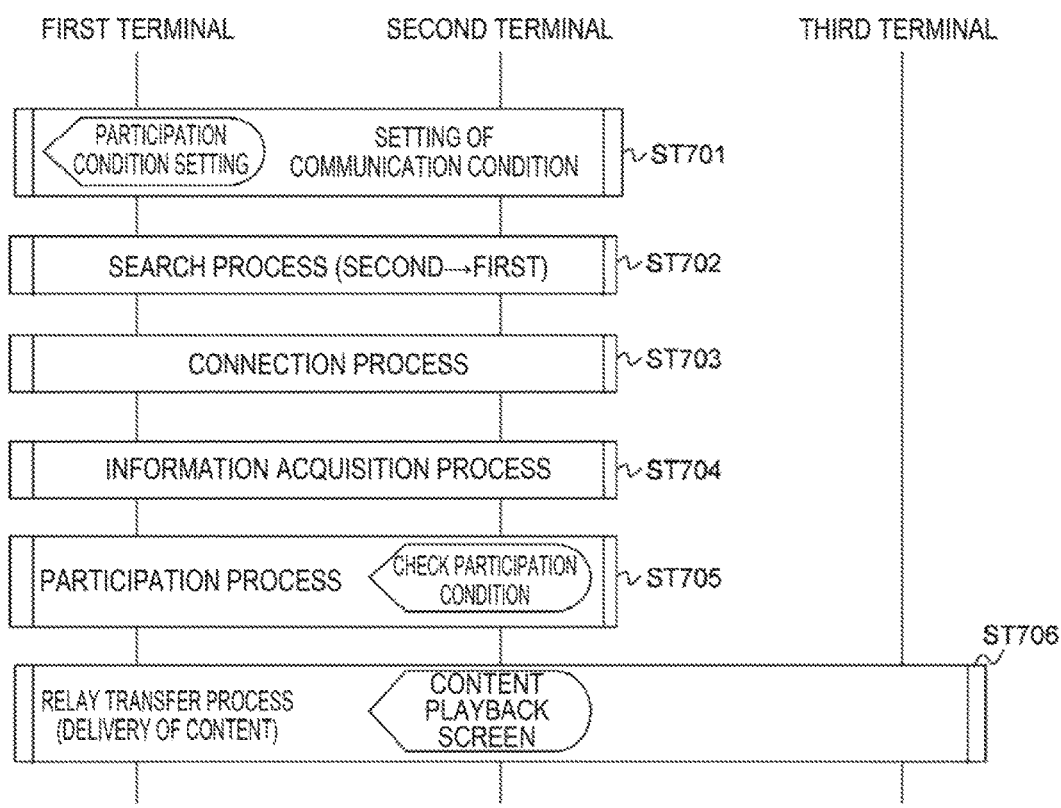
FIG. 27 is a diagram illustrating an example of a process by each terminal in an implementation example 4.

FIG. 27 illustrates an example of a process by each terminal in the implementation example 4. In step ST701, the first terminal 11 and the second terminal 12 set a communication condition. In this time, the user of the first terminal operates the first terminal 11 to enable a communication condition with a cooperator to be set.

Figure 28:
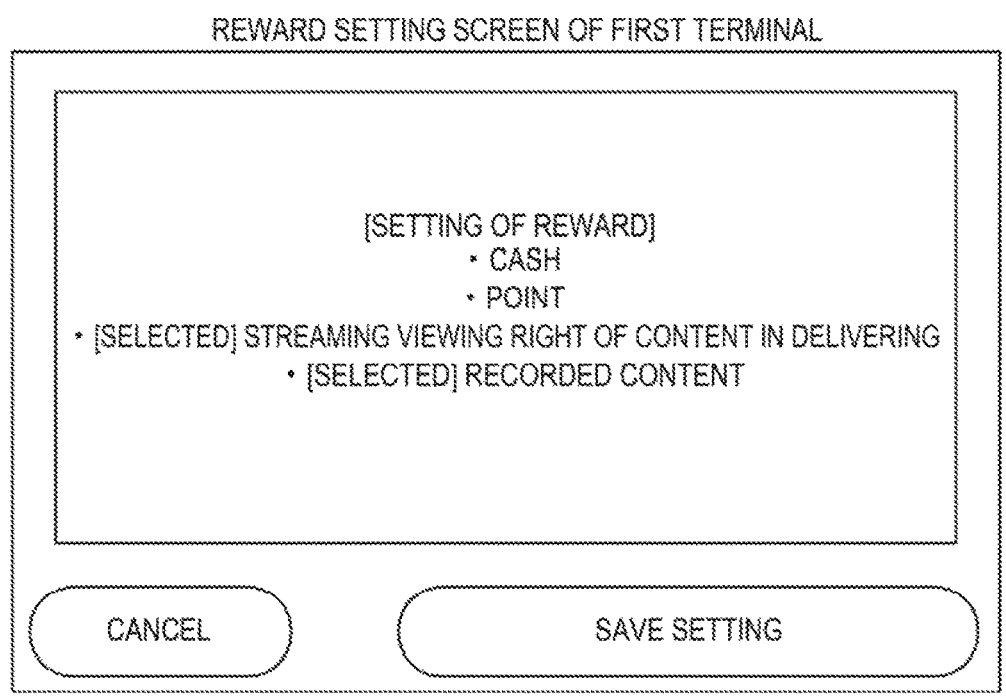
FIG. 28 is a diagram illustrating an example of a reward setting screen of the first terminal.

Examples of communication conditions that can be set in this case include those as follows:
(1) Consideration to cooperator (cash/points/content)
(2) Type of content In addition, examples of types of content include those as follows:
(1) View content in shooting or distributing
(2) Content held by photographer FIG. 28 illustrates an example of a reward setting screen of the first terminal 11. In the illustrated example, selectable items of rewards include "CASH", "STREAMING VIEWING RIGHT OF CONTENT IN DELIVERING", and "RECORDED CONTENT", and the "STREAMING VIEWING RIGHT OF CONTENT IN DELIVERING", and "RECORDED CONTENT" are selected. This screen also displays buttons including "CANCEL" and "SAVE SETTING" buttons.

In addition, in this case, the first terminal 11 can also set a participation condition (request condition) of the user of the second terminal 12 using a communication condition setting form displayed on the display 101. The settings of the participation condition (request condition) are similar to the above-described implementation example 2.

Then, in step ST702, when the user of the second terminal starts the second terminal 12, the second terminal 12 searches for a neighboring first terminal 11. Then, the second terminal 12 is connected to the first terminal 11 discovered by the search in step ST703, and acquires information from the first terminal 11 in step ST704.

Next, in step ST705, the second terminal 12 displays the list of the first terminals 11 discovered by the search on the display 201 and presents it to the user of the second terminal. This display allows the user of the second terminal to check a cooperation target. In this case, the second terminal 12 can display the communication condition (payment method, presence or absence of content delivery, content information in delivering, or the like) or participation condition (request condition) that is set in the first terminal 11 on the display 201. This display allows the user of the second terminal to check the communication condition or participation condition (request condition) that is set in the first terminal 11.

Figure 29:
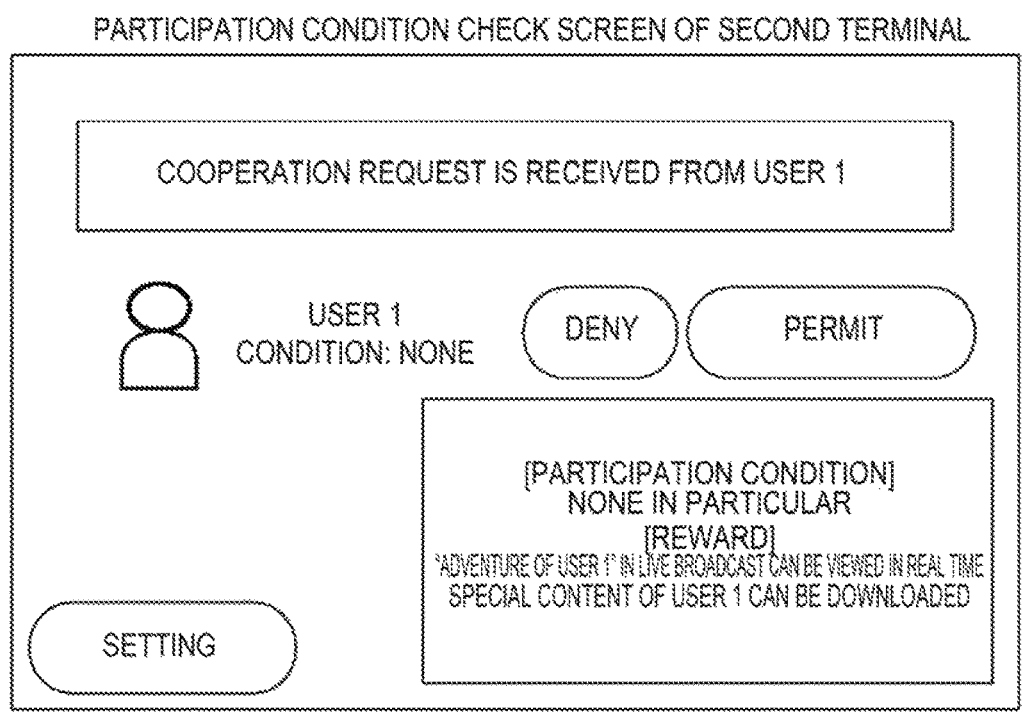
FIG. 29 is a diagram illustrating an example of a participation condition check screen of the second terminal.

FIG. 29 illustrates an example of a participation condition check screen of the second terminal 12. This screen displays a message "COOPERATION REQUEST IS RECEIVED FROM USER 1", and displays the user information "USER 1" and connection condition "CONDITION: NONE" of the first terminal 11. Furthermore, this screen displays a participation condition, rewards, predicted rewards, or the like. In addition, this screen displays buttons including "DENIAL", "PERMIT", and "SETTING" buttons.

In addition, in this case, the user of the second terminal decides to participate in the relay transfer or not. If there is intention to participate, the second terminal 12 transmits a participation request to the first terminal 11. The first terminal 11 displays the participation request from the second terminal 12 on the display 101 and presents it to the photographer serving as the user of the first terminal 11. In this case, the predicted transfer rate (TP) of the second terminal 12 or the estimated cost incurred by using the second terminal 12 as a relay can be displayed. In addition, in this case, the second terminal 12 that is advantageous to communication can be highlighted based on the information acquired from each of the second terminals 12.

The first terminal 11, when receiving the participation request from the second terminal 12, decides to permit or deny the request. The first terminal 11 notifies the second terminal 12 of a result (permission/denial) to the participation request. Then, in step ST706, the first terminal 11 starts data transmission (data transfer) using the second terminal 12 as a relay. In this case, the second terminal 12 displays its transfer rate (TP) or the like on the display 201 and presents it to the user of the second terminal.

Examples of items to be presented in this case include those as follows:
(1) Communication speed
(2) Total transfer amount
(3) Reward In addition, in this case, the first terminal 11 can display the transfer rate or the like of the second terminal 12 on the display 101 and can present it to the photographer serving as the user of the first terminal. Examples of items to be presented for each cooperator or further for all of them in this case include those as follows:

(1) Communication speed (2) Total transfer amount (3) Cost

In this case, when content is selected as a consideration to the cooperator, the first terminal 11 delivers data of the content using an extra channel of Wi-Fi separately from the data communication with the second terminal 12. When content is selected as a consideration to the cooperator, the second terminal 12 can select and view the content delivered from the first terminal 11.

Figure 30:
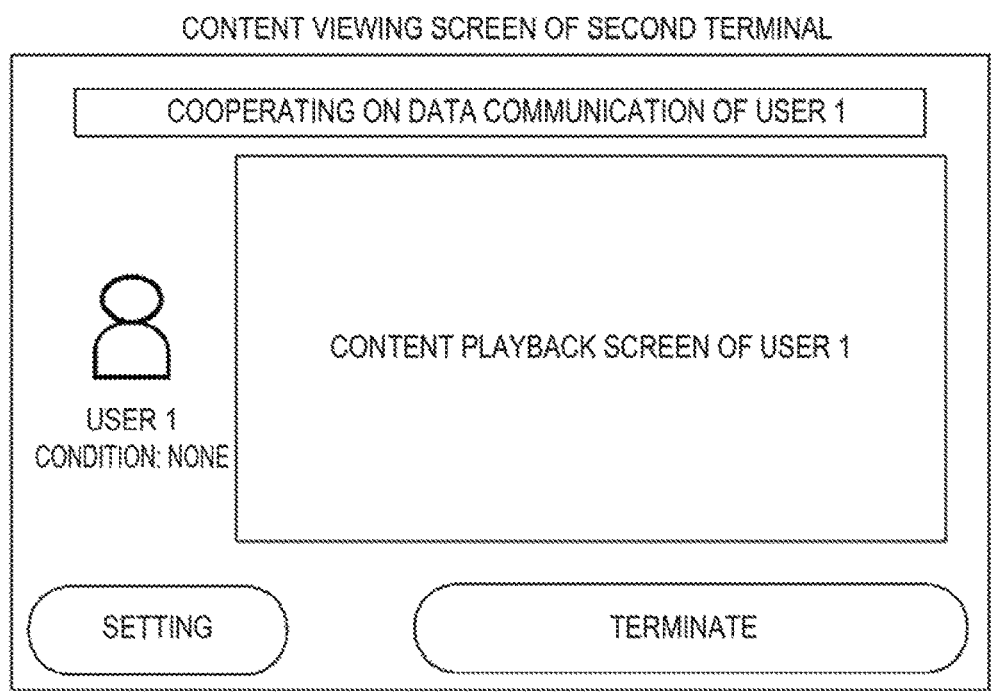
FIG. 30 is a diagram illustrating an example of a content viewing screen of the second terminal.

FIG. 30 illustrates an example of a content viewing screen of the second terminal 12. This screen displays a message "COOPERATING ON DATA COMMUNICATION OF USER 1". This screen shows "CONTENT PLAYBACK SCREEN OF USER 1". In addition, this screen displays buttons including "SETTING" and "TERMINATE" buttons.

An example in which a transmission line is changed by a user interface (UI) operation will be described. In the following, a user 1 as the user of the first terminal performs data communication with a user A as the user of the second terminal, and a user B participates in or withdraws from the communication by operating the UI of the second terminal, which changes the transmission line of the network.

[Participation of User B]

Figure 31:
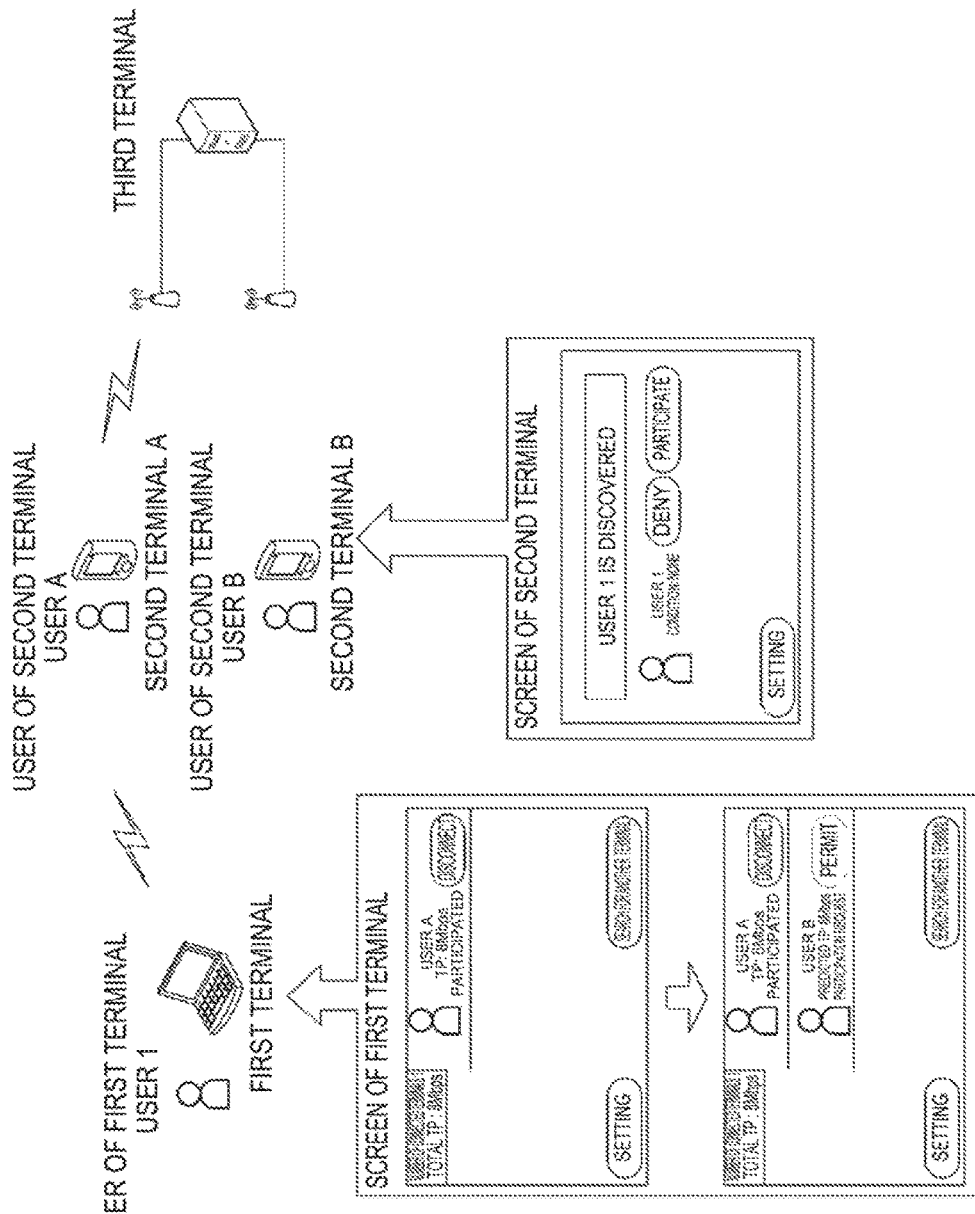
FIG. 31 is a diagram illustrating a procedure until a user B participates in data communication.

FIG. 31 illustrates a procedure until the user B participates in the data communication.

(1) User B operates terminal B and starts program.

(2) Terminal B searches for neighboring first terminal and displays information of user 1 on screen.

(3) User B presses button "PARTICIPATE" to participate in data transfer of user 1 (see the button "PARTICIPATE" in a screen of the second terminal).

(4) Information of user B is displayed on screen of first terminal (see the lower portion of the first terminal's screen in the figure).

(5) User 1 permits participation of user B by pressing button "PERMIT" (see button "PERMIT" in the lower portion of the first terminal's screen in the figure).

Figure 32:
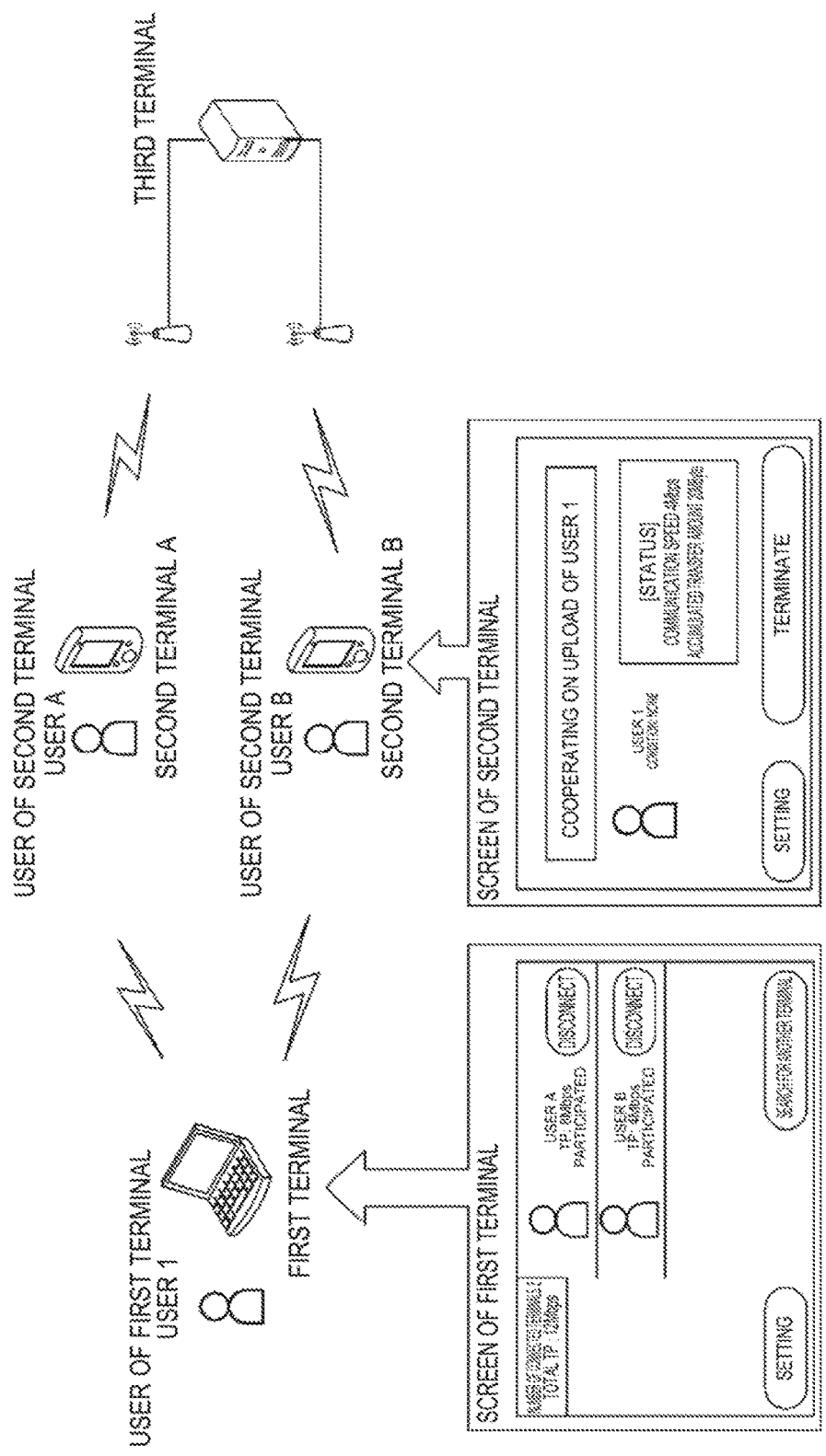
FIG. 32 is a diagram illustrating the state in which the user B participates in data communication (change in a network transmission line by participation of the user B).

Accordingly, the user B participates in the data communication. FIG. 32 illustrates the state in which the user B participates in the data communication. The data communication, which is performed through only the second terminal in the previous figure, is changed through both the second terminals A and B in this figure.

[Withdrawal of User B]

Figure 33:
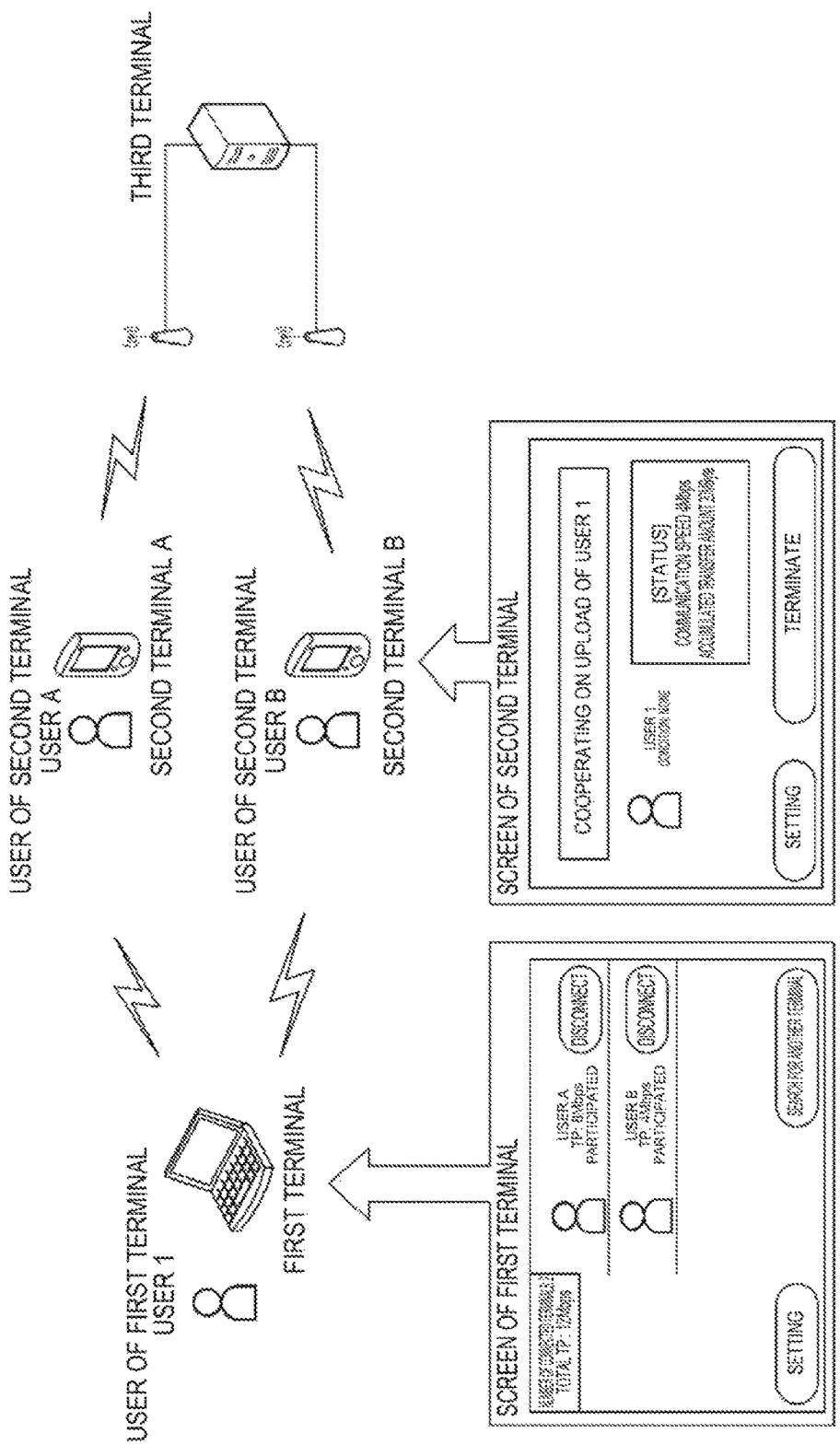
FIG. 33 is a diagram illustrating a procedure in which the user B is released (withdraw) from the data communication.

FIG. 33 illustrates a procedure in which the user B is released (withdraw) from the data communication.

Figure 34:
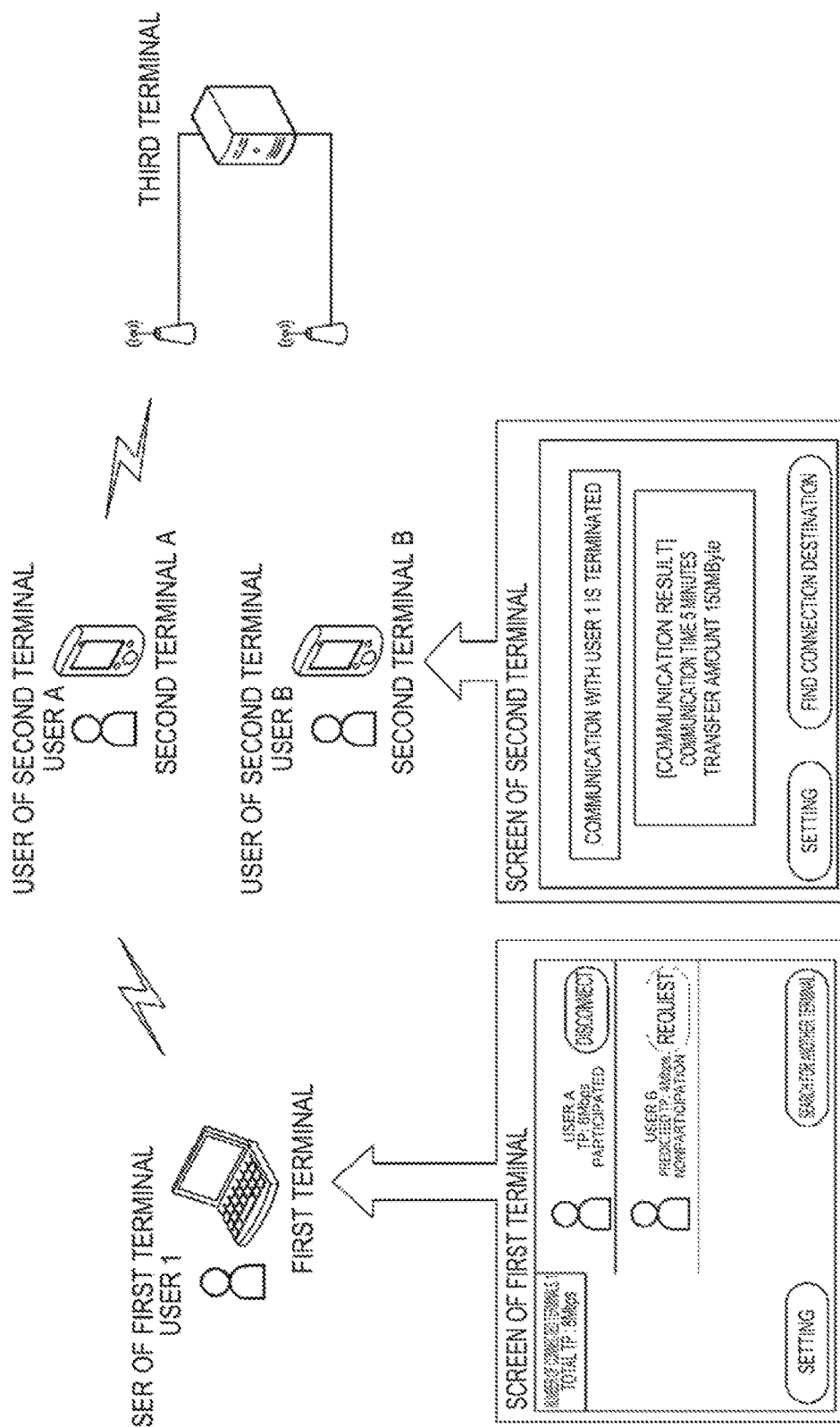
FIG. 34 is a diagram illustrating the state in which the user B is released from data communication (change in a network transmission line by release of the user B).

(1) User B operates terminal B and presses button "TERMINATE" (see the button "TERMINATE" of the screen of the second terminal). Accordingly, the user B is released from the data communication. FIG. 34 illustrates a state in which the user B is released from the data communication. The data communication, which is performed through both the second terminals A and B, is changed through only the second terminal A in this figure.

[Determination of Connection and Disconnection by User From Detailed Status]

Figure 35:
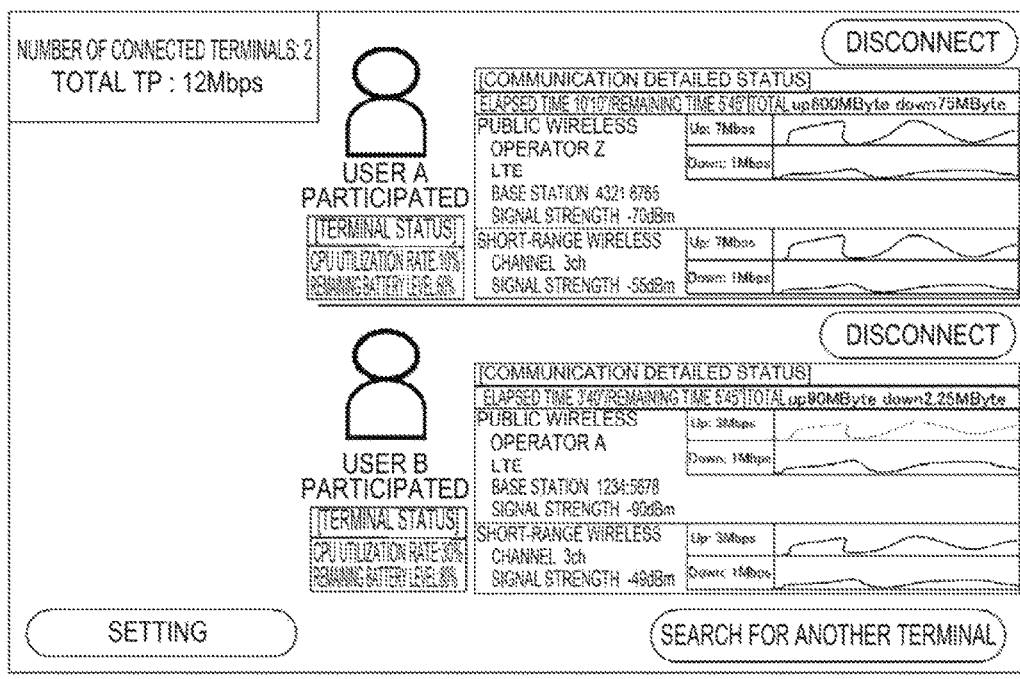
FIG. 35 is a diagram illustrating an example of a screen of the first terminal when detailed status is displayed.
Figure 36:
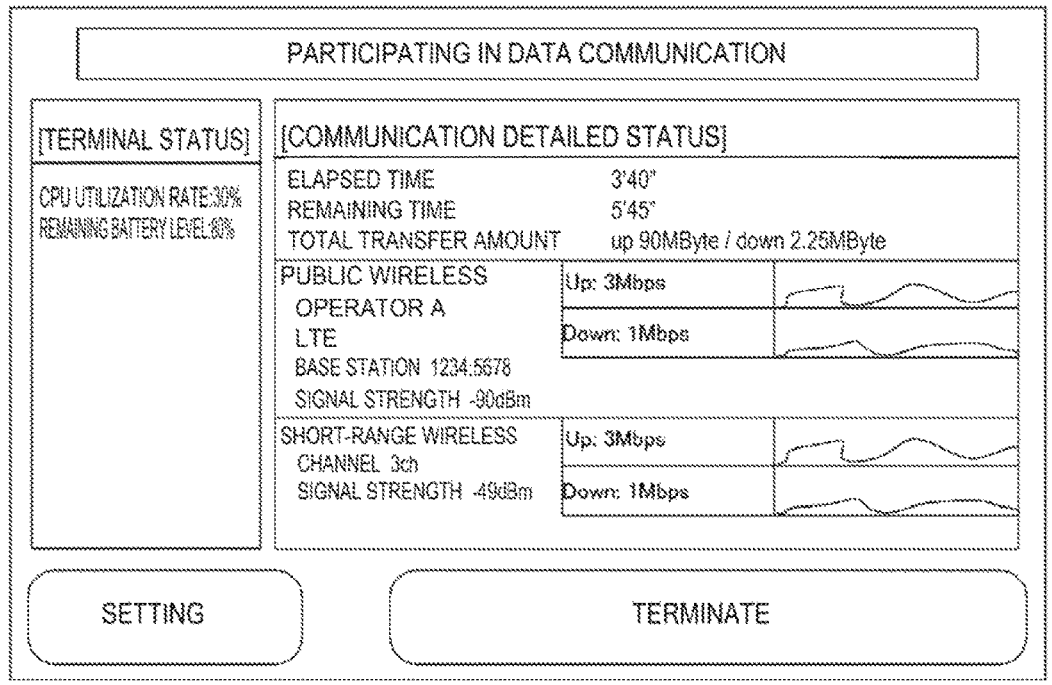
FIG. 36 is a diagram illustrating an example of a screen of the second terminal when detailed status is displayed.

An example in which a terminal displays a detailed status and a user determines whether to connect or disconnect based on the detailed status will be described. FIG. 35 illustrates an example of the screen of the first terminal when the detailed status is displayed. FIG. 36 illustrates an example of the screen of the second terminal when the detailed status is displayed. It shows the screen transition for the following three cases based on these screens.

(1) Reduced remaining battery level of second terminal (2) Reduced short-range wireless performance of second terminal (3) Reduced public wireless performance of second terminal As illustrated in FIGS. 35 and 36, it is assumed that the first terminal can check all the information that can be checked by the second terminal. In the following description, only the screen of the second terminal is used, but the same information is displayed on the first terminal and the user of the first terminal can perform the same operations as the following description.

[Reduced Remaining Battery Level of Second Terminal]

The portion "REMAINING BATTERY LEVEL: 14%" in FIG. 36 is the remaining battery level of the second terminal. By checking this, the user can notice a reduction in the remaining battery level and can perform disconnection.

[Reduced Short-Range Wireless Performance of Second Terminal]

The portion "SHORT-RANGE WIRELESS SIGNAL STRENGTH −49 dBm" in FIG. 36 is the short-range wireless signal strength. By checking this, the user can notice a reduction in short-range wireless performance and can perform disconnection. In addition, the performance improvement and degradation can be checked by representing the past transfer rate as a graph.

[Reduced Public Wireless Performance of Second Terminal]

The portion "PUBLIC WIRELESS SIGNAL STRENGTH −120 dBm" in FIG. 36 is the short-range wireless signal strength. By checking this, the user can notice a reduction in public wireless performance and can perform disconnection. In addition, the performance improvement and degradation can be checked by representing the past transfer rate as a graph.

As described above, in the present embodiment, when there are a plurality of users of the first and second terminals, it is possible to easily identify each other's terminals and to reduce errors of the connection. In addition, in the present embodiment, when it is difficult for the user to determine the optimum combination of the second terminal such as the combination of operators and Wi-Fi communication state, the presentation of information to support determination facilitates the user's determination. In addition, when the communication quality is reduced, it can be expected to improve the communication speed by prompting the user to move. Further, communication cost settings and incentives to cooperators are set to be changeable, and thus the user can construct a network suitable for conditions requested by the cooperators.

<2. Modifications>

In the above embodiments, all the data to be transmitted from the first terminal to the third terminal are transferred through the second terminal as a relay. However, the configuration in which the first terminal may transmit data directly to the third terminal over the public network and in parallel with, data may be transmitted from the first terminal to the third terminal through the second terminal as a relay can be possible. Such a configuration allows the present technology to be applicable. Additionally, the present technology may also be configured as below.

(1) A terminal device including:

a terminal searching unit configured to search for a neighboring terminal device;

a display unit configured to display a list of terminal devices discovered by the terminal searching unit;

a terminal selecting unit configured to select a predetermined terminal device included in the list based on the list displayed on the display unit; and a data transmission unit configured to transmit data using the predetermined terminal device selected by the terminal selecting unit as a relay.

(2) The terminal device according to (1),
wherein the display unit further displays a predicted transfer rate in association with each of the terminal devices being listed.

(3) The terminal device according to (1) or (2),
wherein the display unit displays any one or more of the terminal devices being listed in a display form indicating that selection is recommended.

(4) The terminal device according to any of (1) to (3),
wherein the display unit further displays user information in association with each of the terminal devices being listed.

(5) The terminal device according to any of (1) to (4), further including:

a connection request transmission unit configured to transmit a connection request to the predetermined terminal device selected by the terminal selecting unit; and a reply reception unit configured to receive a reply to the connection request from the predetermined terminal device in response to the connection request, wherein the data transmission unit transmits data using the predetermined terminal device selected by the terminal selecting unit as a relay when the reply received by the reply reception unit indicates connection permission.

(6) The terminal device according to (5),
wherein the connection request transmitted from the connection request transmission unit to the predetermined terminal device additionally includes information indicating a connection condition.

(7) The terminal device according to (5) or (6),
wherein the connection request transmitted from the connection request transmission unit to the predetermined terminal device additionally includes predicted transfer rate information.

(8) The terminal device according to any of (1) to (7),
wherein the data transmitted from the data transmission unit to the predetermined terminal device additionally includes transfer rate information of the predetermined terminal device.

(9) A data transmission method including:
a terminal search step of searching for a neighboring terminal device;

a display step of displaying a list of terminal devices discovered in the terminal search step on a display unit;

a terminal selection step of selecting a predetermined terminal device included in the list based on the list displayed in the display step; and a data transmission step of transmitting data using the predetermined terminal device selected in terminal selection step as a relay.

(10) A terminal device including:
a terminal searching unit configured to search for a neighboring terminal device;

a display unit configured to display a list of terminal devices discovered by the terminal searching unit;

a terminal selecting unit configured to select a predetermined terminal device included in the list based on the list displayed on the display unit; and a data transfer unit configured to relay data sent from the predetermined terminal device selected by the terminal selecting unit.

(11) The terminal device according to (10),
wherein the display unit, when a participation condition is set, displays the participation condition being set in association with each of the terminal devices being listed.

(12) The terminal device according to (10) or (11),
wherein the display unit, when reward is set, displays the reward being set in association with each of the terminal devices being listed.

(13) The terminal device according to any of (10) to (12),
wherein the display unit further displays user information in association with each of the terminal devices being listed.

(14) The terminal device according to (10),
wherein the display unit, when the data transferred from the data transfer unit is content data and the reward is for delivered content viewing, displays a playback screen of the content data.

(15) A data transfer method including:
a terminal search step of searching for a neighboring terminal device;

a display step of displaying a list of terminal devices discovered in the terminal search step on a display unit;

a terminal selection step of selecting a predetermined terminal device included in the list based on the list displayed in the display step; and a data transfer step of relaying data sent from the predetermined terminal device selected in the terminal selection step.

REFERENCE SIGNS LIST

10 communication system
11 first terminal
12A, 12B second terminal
13 third terminal
101 display
102 user input unit
103 communication unit
104 connection management unit
105 transfer controller
106 memory
107 storage
201 display
202 user input unit
203, 204 communication unit
205 relay controller
206 memory
207 connection management unit
301 communication unit
302 transfer controller
303 memory
304 storage

The invention claimed is:

1. A terminal device comprising:
processing circuitry configured to:
connect the terminal device to a second terminal, wherein connecting the terminal device to the second terminal includes the terminal device being configured to
search for a neighboring terminal device, wherein the neighboring terminal device is the second terminal, wherein searching for neighboring terminal device includes receiving short-range wireless information, public network connection information, and terminal information transmitted from the second terminal,
acquire information from the second terminal discovered by the search, investigate a plurality of second terminals recommended to be used for a relay transfer based on the acquired information, the second terminal being included in the plurality of second terminals, display a list of second terminals discovered by the search that are recommended to be used for the relay transfer, the list of second terminals being all or a subset of the plurality of second terminals;

determine if there is a connection request from the second terminal, select the second terminal from the list of second terminals to be used for the relay transfer when there is no connection request from the second terminal, transmit the connection request to the selected second terminal, receive a reply to the connection request from the second terminal in response to the connection request, and transmit data using the selected second terminal as a relay when the selected second terminal reply to the connection request indicates connection permission.

2. The terminal device according to claim 1, wherein the display unit further displays a predicted transfer rate in association with each of the terminal devices being listed.

3. The terminal device according to claim 1, wherein the display unit displays any one or more of the terminal devices being listed in a display form indicating that selection is recommended.

4. The terminal device according to claim 1, wherein the display unit further displays user information in association with each of the terminal devices being listed.

5. The terminal device according to claim 1 wherein the connection request transmitted from the connection request transmission unit to the predetermined terminal device additionally includes information indicating a connection condition.

6. The terminal device according to claim 1, wherein the connection request transmitted from the connection request transmission unit to the predetermined terminal device additionally includes predicted transfer rate information.

7. The terminal device according to claim 1, wherein the data transmitted from the data transmission unit to the predetermined terminal device additionally includes transfer rate information of the predetermined terminal device.

8. A data transmission method comprising:
searching, via a first terminal, for a neighboring terminal device, wherein the neighboring terminal device is a second terminal, wherein searching for neighboring terminal device includes receiving short-range wireless information, public network connection information, and terminal information transmitted from the second terminal;

acquiring information from the second terminal discovered by the search;

investigating a plurality of second terminals recommended to be used for a relay transfer based on the acquired information, the second terminal being included in the plurality of second terminals;

displaying a list of second terminals discovered in the searching that are recommended to be used for the relay transfer, the list of second terminals being all or a subset of the plurality of second terminals;

determining if there is a connection request from the second terminal;

selecting the second terminal from the list of second terminals to be used for the relay transfer when there is no connection request from the second terminal;

transmitting the connection request to the selected second terminal;

receiving a reply to the connection request from the second terminal in response to the connection request; and transmitting data using the selected second-terminal as a relay when the selected second terminal reply to the connection request indicates connection permission.

9. A data transfer method comprising:
searching, via a second terminal, for a terminal device that is a neighboring terminal device;

displaying a list of terminal devices discovered in the searching, the terminal device being included in the list of terminal devices;

determining if there is a connection request from the terminal device;

selecting the terminal device from the plurality of terminal devices to be used for a relay transfer when there is no connection request from the terminal device;

transmitting the connection request to the selected terminal device;

receive a reply to the connection request from the terminal device in response to the connection request; and relaying data sent from the terminal device selected by the second terminal when the selected terminal device reply to the connection request indicates connection permission.

* * * * *